US008856657B2

(12) United States Patent
Arbogast et al.

(10) Patent No.: US 8,856,657 B2
(45) Date of Patent: Oct. 7, 2014

(54) USER INTERFACE FOR MANAGING NETWORK DOWNLOAD AND CONFIGURATION TASKS

(75) Inventors: Christopher P. Arbogast, Reno, NV (US); Bryan Kelly, Alamo, CA (US)

(73) Assignee: Bally Gaming, Inc., Las Vegas, NV (US)

( * ) Notice: Subject to any disclaimer, the term of this patent is extended or adjusted under 35 U.S.C. 154(b) by 1241 days.

(21) Appl. No.: 12/113,038

(22) Filed: Apr. 30, 2008

(65) Prior Publication Data

US 2009/0276715 A1 Nov. 5, 2009

(51) Int. Cl.
*G06F 15/177* (2006.01)
*H04L 12/24* (2006.01)
*H04L 29/06* (2006.01)
*H04L 29/08* (2006.01)

(52) U.S. Cl.
CPC ............. *H04L 41/22* (2013.01); *H04L 67/38* (2013.01); *H04L 67/36* (2013.01); *H04L 67/06* (2013.01)
USPC ........... 715/736; 715/735; 715/740; 715/746; 715/764; 715/783

(58) Field of Classification Search
USPC .................. 715/736, 764, 783, 740, 735, 746
See application file for complete search history.

(56) References Cited

U.S. PATENT DOCUMENTS

| | | | |
|---|---|---|---|
| 4,339,798 A | 7/1982 | Hedges et al. ................. | 364/412 |
| 5,007,649 A | 4/1991 | Richardson | |
| 5,083,800 A | 1/1992 | Lockton .......................... | 273/439 |
| 5,275,400 A | 1/1994 | Weingardt et al. ......... | 273/85 CP |
| 5,321,241 A | 6/1994 | Craine .......................... | 235/380 |
| 5,324,035 A | 6/1994 | Morris et al. ............... | 273/138 A |
| 5,326,104 A | 7/1994 | Pease et al. ................ | 273/138 A |
| 5,398,932 A | 3/1995 | Eberhardt et al. ......... | 273/138 A |
| 5,472,194 A | 12/1995 | Breeding et al. .......... | 273/138 A |
| 5,505,449 A | 4/1996 | Eberhardt et al. ......... | 273/138 A |
| 5,562,284 A | 10/1996 | Stevens ......................... | 273/139 |
| 5,605,334 A | 2/1997 | McCrea, Jr. .................. | 273/309 |
| 5,605,506 A | 2/1997 | Hoorn et al. .................... | 463/47 |
| 5,613,912 A | 3/1997 | Slater .............................. | 463/25 |
| 5,643,086 A | 7/1997 | Alcorn et al. ................... | 463/29 |
| 5,655,961 A | 8/1997 | Acres et al. .................... | 463/27 |
| 5,707,287 A | 1/1998 | McCrea, Jr. .................... | 463/27 |

(Continued)

FOREIGN PATENT DOCUMENTS

| | | |
|---|---|---|
| EP | 1 074 955 A2 | 2/2001 |
| EP | 1 463 008 A2 | 9/2004 |

(Continued)

OTHER PUBLICATIONS

Bing search q=upgrade+gaming+machine+software&FO Jun. 11, 2014.*

(Continued)

*Primary Examiner* — Boris Pesin
*Assistant Examiner* — John Heffington
(74) *Attorney, Agent, or Firm* — Frank Abramonte; Fearon Brown; Marvin Hein

(57) ABSTRACT

A user interface for management of network operations, particularly networked electronic gaming machines, the user interface including operation assignment interfaces, each assignment interface providing information about the respective operation, a calendar interface on which the assignment interfaces are provided, the calendar interface providing at least date and time information, and at least one graphical linking indicator that provides visual relational information of related operations.

40 Claims, 8 Drawing Sheets

(56) References Cited

U.S. PATENT DOCUMENTS

| | | | |
|---|---|---|---|
| 5,741,183 A | 4/1998 | Acres et al. | 463/42 |
| 5,745,110 A * | 4/1998 | Ertemalp | 715/764 |
| 5,759,102 A | 6/1998 | Pease et al. | 463/42 |
| 5,770,533 A | 6/1998 | Franchi | 463/42 |
| 5,779,545 A | 7/1998 | Berg et al. | 463/22 |
| 5,800,268 A | 9/1998 | Molnick | |
| 5,813,912 A | 9/1998 | Shultz | 463/25 |
| 5,823,879 A | 10/1998 | Goldberg et al. | 463/42 |
| 5,830,067 A | 11/1998 | Graves et al. | 463/40 |
| 5,830,068 A | 11/1998 | Brenner et al. | 463/42 |
| 5,851,149 A | 12/1998 | Xidos et al. | 463/42 |
| 5,890,963 A | 4/1999 | Yen | 463/42 |
| 5,895,451 A * | 4/1999 | Yamade et al. | 705/7.18 |
| 5,911,626 A | 6/1999 | McCrea, Jr. | 463/27 |
| 5,957,776 A | 9/1999 | Hoehne | 463/25 |
| 5,971,851 A | 10/1999 | Pascal et al. | 463/24 |
| 5,974,135 A | 10/1999 | Breneman et al. | |
| 5,999,808 A | 12/1999 | LaDue | 455/412 |
| 6,001,016 A | 12/1999 | Walker et al. | 463/42 |
| 6,047,322 A | 4/2000 | Vaid et al. | |
| 6,068,553 A | 5/2000 | Parker | 463/27 |
| 6,077,161 A | 6/2000 | Wisler | 463/11 |
| 6,080,063 A | 6/2000 | Khosla | 463/42 |
| 6,089,980 A | 7/2000 | Gauselmann | 463/27 |
| 6,093,103 A | 7/2000 | McCrea, Jr. | 463/27 |
| 6,102,799 A | 8/2000 | Stupak | 463/27 |
| 6,110,041 A | 8/2000 | Walker et al. | 463/20 |
| 6,110,043 A | 8/2000 | Olsen | 463/27 |
| 6,117,012 A | 9/2000 | McCrea, Jr. | 463/27 |
| 6,134,711 A * | 10/2000 | Nakamura et al. | 717/169 |
| 6,135,887 A | 10/2000 | Pease et al. | 463/42 |
| 6,146,273 A | 11/2000 | Olsen | 463/27 |
| 6,149,522 A | 11/2000 | Alcorn et al. | 463/29 |
| 6,152,824 A | 11/2000 | Rothschild et al. | 463/42 |
| 6,168,523 B1 | 1/2001 | Piechowiak et al. | 463/26 |
| 6,183,366 B1 | 2/2001 | Goldberg et al. | 463/42 |
| 6,185,184 B1 | 2/2001 | Mattaway et al. | |
| 6,186,892 B1 | 2/2001 | Frank et al. | 463/19 |
| 6,210,277 B1 | 4/2001 | Stefan | 463/27 |
| 6,217,447 B1 | 4/2001 | Lofink et al. | 463/12 |
| 6,219,836 B1 | 4/2001 | Wells et al. | 717/11 |
| 6,244,958 B1 | 6/2001 | Acres | 463/26 |
| 6,251,014 B1 | 6/2001 | Stockdale et al. | 463/16 |
| 6,254,483 B1 | 7/2001 | Acres | |
| 6,254,484 B1 | 7/2001 | McCrea, Jr. | 463/27 |
| 6,256,651 B1 * | 7/2001 | Tuli | 715/224 |
| 6,263,499 B1 * | 7/2001 | Nakamura et al. | 717/171 |
| 6,264,561 B1 | 7/2001 | Saffari et al. | 463/42 |
| 6,287,202 B1 | 9/2001 | Pascal et al. | 463/42 |
| 6,302,793 B1 | 10/2001 | Fertitta, III et al. | 463/25 |
| 6,312,332 B1 | 11/2001 | Walker et al. | 463/23 |
| 6,346,044 B1 | 2/2002 | McCrea, Jr. | 463/27 |
| 6,362,836 B1 | 3/2002 | Shaw et al. | |
| 6,380,953 B1 * | 4/2002 | Mizuno | 715/764 |
| 6,383,076 B1 | 5/2002 | Tiedeken | 463/40 |
| 6,389,126 B1 | 5/2002 | Bjornberg et al. | |
| 6,394,900 B1 | 5/2002 | McGlone et al. | 463/20 |
| 6,400,272 B1 | 6/2002 | Holtzman et al. | 340/572.1 |
| 6,401,099 B1 | 6/2002 | Koppolu et al. | |
| 6,409,602 B1 | 6/2002 | Wiltshire et al. | 463/42 |
| 6,443,839 B2 | 9/2002 | Stockdale et al. | 463/16 |
| 6,459,882 B1 | 10/2002 | Palermo et al. | |
| 6,464,584 B2 | 10/2002 | Oliver | 463/25 |
| 6,473,794 B1 * | 10/2002 | Guheen et al. | 709/223 |
| 6,490,285 B2 | 12/2002 | Lee et al. | |
| 6,503,147 B1 | 1/2003 | Stockdale et al. | 463/29 |
| 6,505,772 B1 | 1/2003 | Mollett et al. | 235/379 |
| 6,508,710 B1 | 1/2003 | Paravia et al. | 463/42 |
| 6,516,350 B1 | 2/2003 | Lumelsky et al. | |
| 6,519,571 B1 * | 2/2003 | Guheen et al. | 705/14.66 |
| 6,527,638 B1 | 3/2003 | Walker et al. | 463/25 |
| 6,536,037 B1 * | 3/2003 | Guheen et al. | 717/151 |
| 6,606,744 B1 * | 8/2003 | Mikurak | 717/174 |
| 6,607,441 B1 | 8/2003 | Acres | 463/25 |
| 6,609,978 B1 | 8/2003 | Paulsen | 463/42 |
| 6,615,166 B1 * | 9/2003 | Guheen et al. | 703/27 |
| 6,629,184 B1 | 9/2003 | Berg et al. | 710/306 |
| 6,638,170 B1 | 10/2003 | Crumby | 463/42 |
| 6,645,077 B2 | 11/2003 | Rowe | 463/42 |
| 6,652,378 B2 | 11/2003 | Cannon et al. | 463/20 |
| 6,656,048 B2 | 12/2003 | Olsen | 463/25 |
| 6,671,818 B1 * | 12/2003 | Mikurak | 714/4.21 |
| 6,675,152 B1 | 1/2004 | Prasad et al. | 705/64 |
| 6,676,522 B2 | 1/2004 | Rowe et al. | 463/42 |
| 6,682,421 B1 | 1/2004 | Rowe et al. | 463/25 |
| 6,682,423 B2 | 1/2004 | Brosnan et al. | 463/29 |
| 6,685,564 B2 | 2/2004 | Oliver | 463/25 |
| 6,685,567 B2 | 2/2004 | Cockerille et al. | 463/43 |
| 6,699,128 B1 | 3/2004 | Beadell et al. | 463/46 |
| 6,702,291 B2 | 3/2004 | Grebler et al. | 273/292 |
| 6,712,695 B2 | 3/2004 | Mothwurf et al. | 463/25 |
| 6,718,361 B1 | 4/2004 | Basani et al. | 709/201 |
| 6,721,713 B1 * | 4/2004 | Guheen et al. | 705/1.1 |
| 6,722,985 B2 | 4/2004 | Criss-Puszkiewicz et al. | |
| 6,743,102 B1 | 6/2004 | Fiechter et al. | 463/42 |
| 6,746,330 B2 | 6/2004 | Cannon | 463/25 |
| 6,755,741 B1 | 6/2004 | Rafaeli | 463/25 |
| 6,800,029 B2 | 10/2004 | Rowe et al. | 463/25 |
| 6,811,488 B2 | 11/2004 | Paravia et al. | 463/42 |
| 6,817,948 B2 | 11/2004 | Pascal et al. | 463/42 |
| 6,823,419 B2 | 11/2004 | Berg et al. | 710/306 |
| 6,837,789 B2 | 1/2005 | Garahi et al. | 463/29 |
| 6,848,994 B1 | 2/2005 | Knust et al. | 463/25 |
| 6,866,581 B2 | 3/2005 | Martinek et al. | 463/16 |
| 6,884,170 B2 | 4/2005 | Rowe | |
| 6,884,173 B2 | 4/2005 | Gauselmann | 463/42 |
| 6,884,174 B2 | 4/2005 | Lundy et al. | 463/42 |
| 6,896,618 B2 | 5/2005 | Benoy et al. | 463/25 |
| 6,899,627 B2 | 5/2005 | Lam et al. | 463/40 |
| 6,908,387 B2 | 6/2005 | Hedrick et al. | 463/31 |
| 6,957,186 B1 * | 10/2005 | Guheen et al. | 705/323 |
| 6,971,956 B2 | 12/2005 | Rowe et al. | 463/25 |
| 6,972,682 B2 | 12/2005 | Lareau et al. | 340/568.1 |
| 6,993,587 B1 | 1/2006 | Basani et al. | 709/229 |
| 6,997,803 B2 | 2/2006 | LeMay et al. | 463/20 |
| 7,013,469 B2 | 3/2006 | Smith et al. | |
| 7,025,674 B2 | 4/2006 | Adams et al. | 463/1 |
| 7,027,996 B2 * | 4/2006 | Levinson | 705/7.26 |
| 7,050,056 B2 * | 5/2006 | Meyringer | 345/440 |
| 7,051,319 B1 * | 5/2006 | Thorson et al. | 717/122 |
| 7,062,470 B2 | 6/2006 | Prasad et al. | 705/64 |
| 7,086,947 B2 | 8/2006 | Walker et al. | 463/25 |
| 7,099,035 B2 | 8/2006 | Brooks et al. | 358/1.15 |
| 7,100,184 B1 | 8/2006 | Kahn | |
| 7,112,138 B2 | 9/2006 | Hedrick et al. | 463/29 |
| 7,120,879 B2 * | 10/2006 | Gutberlet et al. | 715/853 |
| 7,124,101 B1 * | 10/2006 | Mikurak | 705/35 |
| 7,130,807 B1 * | 10/2006 | Mikurak | 705/7.25 |
| 7,147,558 B2 | 12/2006 | Giobbi | 463/25 |
| 7,168,089 B2 | 1/2007 | Nguyen et al. | 726/4 |
| 7,186,181 B2 | 3/2007 | Rowe | 463/42 |
| RE39,644 E | 5/2007 | Alcorn et al. | 380/251 |
| 7,260,834 B1 | 8/2007 | Carlson | |
| 7,291,068 B2 | 11/2007 | Bryant et al. | 463/25 |
| 7,300,352 B2 | 11/2007 | Rowe | |
| 7,303,475 B2 * | 12/2007 | Britt et al. | 463/42 |
| 7,309,065 B2 | 12/2007 | Yoseloff et al. | 273/292 |
| 7,311,605 B2 | 12/2007 | Moser | 463/25 |
| 7,329,185 B2 | 2/2008 | Conover et al. | 463/25 |
| 7,330,822 B1 * | 2/2008 | Robson et al. | 705/7.15 |
| 7,331,520 B2 | 2/2008 | Silva et al. | 235/381 |
| 7,337,330 B2 | 2/2008 | Gatto et al. | |
| 7,346,682 B2 | 3/2008 | Basani et al. | 709/224 |
| 7,349,920 B1 * | 3/2008 | Feinberg et al. | 1/1 |
| 7,351,147 B2 | 4/2008 | Stockdale et al. | 463/29 |
| 7,353,183 B1 * | 4/2008 | Musso | 705/7.21 |
| 7,356,770 B1 * | 4/2008 | Jackson | 715/736 |
| 7,363,342 B1 * | 4/2008 | Wang et al. | 709/204 |
| 7,364,510 B2 | 4/2008 | Walker et al. | 463/42 |
| 7,370,282 B2 * | 5/2008 | Cary | 715/772 |
| 7,384,339 B2 | 6/2008 | LeMay et al. | 463/30 |
| 7,398,327 B2 * | 7/2008 | Lee | 709/250 |
| 7,410,422 B2 * | 8/2008 | Fine | 463/42 |
| 7,419,428 B2 | 9/2008 | Rowe | 463/25 |

(56) References Cited

U.S. PATENT DOCUMENTS

| | | | |
|---|---|---|---|
| 7,427,233 B2 | 9/2008 | Walker et al. ............... 463/16 |
| 7,427,236 B2 | 9/2008 | Kaminkow et al. ........... 463/26 |
| 7,434,805 B2 | 10/2008 | Grauzer et al. ........ 273/149 R |
| 7,438,643 B2 | 10/2008 | Brosnan et al. .............. 463/42 |
| 7,455,591 B2 | 11/2008 | Nguyen ....................... 463/42 |
| 7,460,863 B2 | 12/2008 | Steelberg et al. ........... 455/419 |
| 7,465,231 B2 | 12/2008 | Lewin et al. ................. 463/37 |
| 7,473,178 B2* | 1/2009 | Boyd et al. .................. 463/42 |
| 7,483,394 B2* | 1/2009 | Chang et al. ............... 370/254 |
| 7,515,718 B2 | 4/2009 | Nguyen et al. ............. 380/278 |
| 7,534,169 B2 | 5/2009 | Amaitis et al. .............. 463/39 |
| 7,549,576 B2 | 6/2009 | Alderucci et al. .......... 235/380 |
| 7,566,274 B2* | 7/2009 | Johnson et al. .............. 463/42 |
| 7,575,234 B2 | 8/2009 | Soltys ..................... 273/149 R |
| 7,578,739 B2 | 8/2009 | Gauselmann ................. 463/27 |
| 7,581,256 B2 | 8/2009 | Cockerille et al. ........... 726/30 |
| 7,585,217 B2 | 9/2009 | Lutnick et al. ............... 463/16 |
| 7,594,030 B2 | 9/2009 | Teodosiu et al. |
| 7,607,976 B2 | 10/2009 | Baerlocher et al. |
| 7,607,977 B2 | 10/2009 | Baerlocher et al. |
| 7,610,549 B2* | 10/2009 | Vignet ........................ 715/227 |
| 7,611,407 B1 | 11/2009 | Itkis et al. ................... 463/29 |
| 7,611,409 B2 | 11/2009 | Muir et al. ................... 463/29 |
| 7,617,151 B2 | 11/2009 | Rowe .......................... 705/39 |
| 7,618,317 B2 | 11/2009 | Jackson ....................... 463/24 |
| 7,621,809 B2 | 11/2009 | Baerlocher et al. |
| 7,629,886 B2 | 12/2009 | Steeves ..................... 340/572.1 |
| 7,634,550 B2 | 12/2009 | Wolber et al. .............. 709/220 |
| 7,648,414 B2 | 1/2010 | McNutt et al. ............... 463/25 |
| 7,666,081 B2 | 2/2010 | Baerlocher et al. |
| 7,674,179 B2 | 3/2010 | Baerlocher et al. |
| 7,682,249 B2 | 3/2010 | Winans et al. ............... 463/31 |
| 7,686,688 B2 | 3/2010 | Friedman et al. ............ 463/25 |
| 7,688,322 B2* | 3/2010 | Kapler et al. ............... 345/440 |
| 7,699,703 B2 | 4/2010 | Muir et al. ................... 463/29 |
| 7,702,719 B1 | 4/2010 | Betz et al. |
| 7,706,895 B2 | 4/2010 | Callaghan |
| 7,710,999 B2* | 5/2010 | Bolder et al. ............... 370/465 |
| 7,712,050 B2* | 5/2010 | Gutberlet et al. ........... 715/853 |
| 7,716,077 B1* | 5/2010 | Mikurak ..................... 705/7.12 |
| 7,722,453 B2 | 5/2010 | Lark et al. ................... 463/16 |
| 7,730,198 B2 | 6/2010 | Ruppert et al. ............. 709/230 |
| 7,747,741 B2 | 6/2010 | Basani et al. ............... 709/224 |
| 7,769,877 B2* | 8/2010 | McBride et al. ............ 709/230 |
| 7,778,635 B2 | 8/2010 | Crookham et al. ........ 455/426.1 |
| 7,780,526 B2 | 8/2010 | Nguyen et al. ............... 463/29 |
| 7,780,529 B2 | 8/2010 | Rowe et al. .................. 463/42 |
| 7,785,204 B2 | 8/2010 | Wells et al. |
| 7,788,503 B2 | 8/2010 | Gatto et al. |
| 7,841,946 B2 | 11/2010 | Walker et al. ............... 463/42 |
| 7,844,944 B2* | 11/2010 | Gutberlet et al. ........... 717/105 |
| 7,846,020 B2 | 12/2010 | Walker et al. ............... 463/29 |
| 7,850,528 B2 | 12/2010 | Wells ........................... 463/42 |
| 7,862,425 B2 | 1/2011 | Cavagna ...................... 463/42 |
| 7,867,081 B2 | 1/2011 | Schneider et al. ........... 463/25 |
| 7,873,430 B1* | 1/2011 | Sprecher ..................... 700/100 |
| 7,874,920 B2 | 1/2011 | Hornik et al. ................ 463/42 |
| 7,874,921 B2 | 1/2011 | Baszucki et al. ............. 463/43 |
| 7,881,745 B1* | 2/2011 | Rao et al. ................... 455/551 |
| 7,892,093 B2 | 2/2011 | Kniesteadt et al. |
| 7,898,679 B2 | 3/2011 | Brack et al. ................ 358/1.15 |
| 7,901,294 B2 | 3/2011 | Walker et al. ............... 463/42 |
| 7,908,486 B2 | 3/2011 | Gatto et al. |
| 7,918,735 B2 | 4/2011 | Inamura |
| 7,921,026 B2* | 4/2011 | O'Cull et al. .............. 705/7.23 |
| 7,921,405 B2* | 4/2011 | Gupta et al. ................ 717/102 |
| 7,937,464 B2 | 5/2011 | Ruppert et al. ............. 709/224 |
| 7,957,991 B2* | 6/2011 | Mikurak ..................... 705/7.11 |
| 7,963,847 B2 | 6/2011 | Baerlocher |
| 7,993,199 B2 | 8/2011 | Iddings et al. |
| 8,028,046 B2 | 9/2011 | Elliott et al. ................ 709/220 |
| 8,033,913 B2 | 10/2011 | Cockerille et al. |
| 8,041,792 B2* | 10/2011 | Donaghey et al. .......... 709/221 |
| 8,051,180 B2* | 11/2011 | Mazzaferri et al. ......... 709/227 |
| 8,057,297 B2 | 11/2011 | Silvestro |
| 8,073,657 B2* | 12/2011 | Moore, III et al. |
| 8,078,688 B2* | 12/2011 | Ansari et al. ............... 709/217 |
| 8,117,461 B2 | 2/2012 | Bigelow, Jr. et al. |
| 8,197,344 B2 | 6/2012 | Rathsack et al. |
| 8,201,229 B2 | 6/2012 | Ruppert et al. |
| 8,280,777 B2 | 10/2012 | Mengerink et al. |
| 8,397,264 B2* | 3/2013 | Ansari et al. ................. 725/74 |
| 8,543,665 B2* | 9/2013 | Ansari et al. ............... 709/218 |
| 2001/0019966 A1 | 9/2001 | Idaka ........................... 463/40 |
| 2002/0004824 A1 | 1/2002 | Cuan et al. |
| 2002/0111213 A1 | 8/2002 | McEntee et al. ............. 463/42 |
| 2002/0113371 A1 | 8/2002 | Snow .......................... 273/292 |
| 2002/0115487 A1 | 8/2002 | Wells ........................... 463/42 |
| 2002/0142825 A1 | 10/2002 | Lark et al. .................... 463/16 |
| 2002/0142844 A1 | 10/2002 | Kerr ............................. 463/42 |
| 2002/0152120 A1 | 10/2002 | Howington |
| 2002/0154178 A1* | 10/2002 | Barnett et al. .............. 345/853 |
| 2003/0004871 A1 | 1/2003 | Rowe ........................... 705/39 |
| 2003/0032474 A1 | 2/2003 | Kaminkow ................... 463/25 |
| 2003/0042679 A1 | 3/2003 | Snow .......................... 273/292 |
| 2003/0050832 A1* | 3/2003 | Jacobs et al. ................. 705/14 |
| 2003/0061433 A1* | 3/2003 | Hall et al. ...................... 711/1 |
| 2003/0064798 A1 | 4/2003 | Grauzer et al. .............. 463/29 |
| 2003/0075869 A1 | 4/2003 | Breeding et al. ........... 273/292 |
| 2003/0078103 A1 | 4/2003 | LeMay et al. ................ 463/43 |
| 2003/0090064 A1 | 5/2003 | Hoyt et al. .................. 273/292 |
| 2003/0100369 A1 | 5/2003 | Gatto et al. |
| 2003/0130024 A1 | 7/2003 | Darby .......................... 463/13 |
| 2003/0131073 A1* | 7/2003 | Lucovsky et al. .......... 709/219 |
| 2003/0182414 A1 | 9/2003 | O'Neill |
| 2003/0185229 A1* | 10/2003 | Shachar et al. ............. 370/460 |
| 2003/0206548 A1 | 11/2003 | Bannai et al. .............. 370/389 |
| 2003/0224858 A1 | 12/2003 | Yoseloff et al. .............. 463/43 |
| 2003/0225732 A1* | 12/2003 | Chan et al. .................... 707/1 |
| 2003/0228912 A1 | 12/2003 | Wells et al. .................. 463/43 |
| 2003/0232651 A1 | 12/2003 | Huard et al. ................. 463/42 |
| 2004/0002386 A1 | 1/2004 | Wolfe et al. ................. 463/42 |
| 2004/0002388 A1 | 1/2004 | Larsen et al. ................ 463/43 |
| 2004/0018831 A1* | 1/2004 | Majmundar et al. ........ 455/419 |
| 2004/0029635 A1 | 2/2004 | Giobbi ......................... 463/30 |
| 2004/0043815 A1 | 3/2004 | Kaminkow ................... 463/25 |
| 2004/0043820 A1 | 3/2004 | Schlottmann ................ 463/43 |
| 2004/0048671 A1 | 3/2004 | Rowe ........................... 463/42 |
| 2004/0056775 A1* | 3/2004 | Crookham et al. ......... 340/825 |
| 2004/0064351 A1* | 4/2004 | Mikurak .......................... 705/7 |
| 2004/0064817 A1* | 4/2004 | Shibayama et al. ......... 718/104 |
| 2004/0068654 A1 | 4/2004 | Cockerille et al. .......... 713/168 |
| 2004/0078257 A1* | 4/2004 | Schweitzer et al. ........... 705/9 |
| 2004/0082385 A1 | 4/2004 | Silva et al. ................... 463/40 |
| 2004/0088364 A1* | 5/2004 | Yamadaji .................... 709/208 |
| 2004/0106452 A1 | 6/2004 | Nguyen et al. ............... 463/42 |
| 2004/0107125 A1* | 6/2004 | Guheen et al. .................. 705/7 |
| 2004/0110119 A1* | 6/2004 | Riconda et al. ............. 434/350 |
| 2004/0119713 A1* | 6/2004 | Meyringer .................. 345/440 |
| 2004/0127291 A1 | 7/2004 | George et al. ................ 463/42 |
| 2004/0133485 A1 | 7/2004 | Schoonmaker et al. ........ 705/30 |
| 2004/0142744 A1 | 7/2004 | Atkinson et al. ............. 463/29 |
| 2004/0166918 A1 | 8/2004 | Walker et al. ................ 463/16 |
| 2004/0166940 A1 | 8/2004 | Rothschild ................... 463/42 |
| 2004/0181540 A1* | 9/2004 | Jung et al. .................. 707/100 |
| 2004/0185936 A1 | 9/2004 | Block et al. .................. 463/42 |
| 2004/0229684 A1 | 11/2004 | Blackburn et al. |
| 2004/0249708 A1* | 12/2004 | Jacobs et al. ................. 705/14 |
| 2004/0254010 A1 | 12/2004 | Fine ............................. 463/25 |
| 2004/0254993 A1 | 12/2004 | Mamas |
| 2005/0043094 A1 | 2/2005 | Nguyen et al. ............... 463/42 |
| 2005/0054438 A1 | 3/2005 | Rothschild et al. .......... 463/29 |
| 2005/0054445 A1 | 3/2005 | Gatto et al. ................... 463/42 |
| 2005/0055113 A1 | 3/2005 | Gauselmann ................. 700/91 |
| 2005/0070358 A1 | 3/2005 | Angell et al. ................. 463/39 |
| 2005/0080898 A1 | 4/2005 | Block |
| 2005/0114534 A1 | 5/2005 | Lee ............................ 709/320 |
| 2005/0119052 A1* | 6/2005 | Russell et al. ................ 463/42 |
| 2005/0143166 A1 | 6/2005 | Walker et al. ................ 463/25 |
| 2005/0153778 A1 | 7/2005 | Nelson et al. ................ 463/42 |
| 2005/0171808 A1 | 8/2005 | Saenz et al. |
| 2005/0181856 A1 | 8/2005 | Cannon et al. ............... 463/16 |
| 2005/0181864 A1 | 8/2005 | Britt et al. .................... 463/25 |
| 2005/0221882 A1 | 10/2005 | Nguyen et al. ............... 463/16 |

(56) References Cited

U.S. PATENT DOCUMENTS

| | | | |
|---|---|---|---|
| 2005/0222891 A1* | 10/2005 | Chan et al. | 705/9 |
| 2005/0222971 A1* | 10/2005 | Cary | 707/1 |
| 2005/0239542 A1 | 10/2005 | Olsen | 463/27 |
| 2005/0240663 A1 | 10/2005 | Wolber et al. | 709/220 |
| 2005/0282626 A1 | 12/2005 | Manfredi et al. | 463/25 |
| 2006/0004618 A1 | 1/2006 | Brixius | 705/8 |
| 2006/0009282 A1 | 1/2006 | George et al. | 463/29 |
| 2006/0015716 A1 | 1/2006 | Thornton et al. | 713/155 |
| 2006/0026499 A1* | 2/2006 | Weddle | 715/503 |
| 2006/0035707 A1 | 2/2006 | Nguyen et al. | 463/29 |
| 2006/0066444 A1 | 3/2006 | Steeves | 340/10.5 |
| 2006/0079310 A1 | 4/2006 | Friedman et al. | 463/16 |
| 2006/0116208 A1 | 6/2006 | Chen et al. | 463/43 |
| 2006/0117314 A1 | 6/2006 | Sato | |
| 2006/0121970 A1 | 6/2006 | Khal | 463/16 |
| 2006/0130046 A1 | 6/2006 | O'Neill | |
| 2006/0133399 A1* | 6/2006 | Chang et al. | 370/420 |
| 2006/0146017 A1* | 7/2006 | Leung et al. | 345/156 |
| 2006/0178918 A1* | 8/2006 | Mikurak | 705/7 |
| 2006/0183541 A1 | 8/2006 | Okada et al. | 463/29 |
| 2006/0195847 A1* | 8/2006 | Amano et al. | 718/103 |
| 2006/0205508 A1 | 9/2006 | Green | 463/40 |
| 2006/0217202 A1 | 9/2006 | Burke et al. | |
| 2006/0247013 A1 | 11/2006 | Walker et al. | 463/20 |
| 2006/0247057 A1 | 11/2006 | Green et al. | 463/42 |
| 2006/0248161 A1 | 11/2006 | O'Brien et al. | 709/217 |
| 2006/0252530 A1 | 11/2006 | Oberberger et al. | |
| 2006/0253702 A1 | 11/2006 | Lowell et al. | |
| 2006/0259604 A1 | 11/2006 | Kotchavi et al. | |
| 2006/0277487 A1 | 12/2006 | Poulsen et al. | 715/772 |
| 2006/0281556 A1 | 12/2006 | Solomon et al. | 463/43 |
| 2006/0287077 A1 | 12/2006 | Grav et al. | 463/27 |
| 2006/0287098 A1 | 12/2006 | Morrow et al. | |
| 2007/0006329 A1 | 1/2007 | Morrow et al. | 726/34 |
| 2007/0015583 A1 | 1/2007 | Tran | 463/40 |
| 2007/0026935 A1* | 2/2007 | Wolf et al. | 463/25 |
| 2007/0032288 A1 | 2/2007 | Nelson et al. | |
| 2007/0033247 A1* | 2/2007 | Martin | 709/201 |
| 2007/0038728 A1* | 2/2007 | Jacobs et al. | 709/219 |
| 2007/0043861 A1* | 2/2007 | Baron et al. | 709/224 |
| 2007/0054740 A1 | 3/2007 | Salls et al. | 463/42 |
| 2007/0057469 A1 | 3/2007 | Grauzer et al. | 273/309 |
| 2007/0060259 A1 | 3/2007 | Pececnik | 463/16 |
| 2007/0060307 A1 | 3/2007 | Mathis et al. | 463/25 |
| 2007/0060365 A1 | 3/2007 | Tien et al. | 463/42 |
| 2007/0067768 A1 | 3/2007 | Breckner et al. | |
| 2007/0077990 A1 | 4/2007 | Cuddy et al. | 463/25 |
| 2007/0077995 A1 | 4/2007 | Oak et al. | 463/42 |
| 2007/0082737 A1 | 4/2007 | Morrow et al. | 463/42 |
| 2007/0093298 A1 | 4/2007 | Brunet | 463/42 |
| 2007/0105628 A1 | 5/2007 | Arbogast et al. | 463/42 |
| 2007/0111775 A1 | 5/2007 | Yoseloff | 463/16 |
| 2007/0111791 A1 | 5/2007 | Arbogast et al. | 463/40 |
| 2007/0111794 A1* | 5/2007 | Hogan et al. | 463/42 |
| 2007/0112627 A1* | 5/2007 | Jacobs et al. | 705/14 |
| 2007/0117608 A1 | 5/2007 | Roper et al. | 463/16 |
| 2007/0124483 A1 | 5/2007 | Marples et al. | 709/228 |
| 2007/0129145 A1 | 6/2007 | Blackburn et al. | 463/42 |
| 2007/0129986 A1* | 6/2007 | Barnett et al. | 705/3 |
| 2007/0150329 A1 | 6/2007 | Brook et al. | 705/8 |
| 2007/0155490 A1* | 7/2007 | Phillips et al. | 463/29 |
| 2007/0167235 A1 | 7/2007 | Naicker | 463/42 |
| 2007/0191102 A1 | 8/2007 | Coliz et al. | 463/42 |
| 2007/0192748 A1 | 8/2007 | Martin et al. | 715/856 |
| 2007/0198418 A1 | 8/2007 | MacDonald et al. | 705/52 |
| 2007/0207850 A1 | 9/2007 | Darrah et al. | 463/20 |
| 2007/0208816 A1 | 9/2007 | Baldwin et al. | 709/206 |
| 2007/0214030 A1 | 9/2007 | Shear et al. | |
| 2007/0218998 A1 | 9/2007 | Arbogast et al. | 463/42 |
| 2007/0235521 A1 | 10/2007 | Mateen et al. | 235/379 |
| 2007/0243925 A1 | 10/2007 | LeMay et al. | 463/20 |
| 2007/0243927 A1 | 10/2007 | Soltys | 463/25 |
| 2007/0243935 A1 | 10/2007 | Huizinga | 463/42 |
| 2007/0255842 A1* | 11/2007 | Bolder et al. | 709/230 |
| 2007/0259709 A1 | 11/2007 | Kelly et al. | 463/20 |
| 2007/0259711 A1 | 11/2007 | Thomas | 463/22 |
| 2007/0287535 A1 | 12/2007 | Soltys | 463/29 |
| 2007/0298868 A1 | 12/2007 | Soltys | 463/25 |
| 2008/0004108 A1 | 1/2008 | Klinkhammer | 463/29 |
| 2008/0009344 A1* | 1/2008 | Graham et al. | 463/25 |
| 2008/0015951 A1* | 1/2008 | Kerker et al. | 705/26 |
| 2008/0026832 A1 | 1/2008 | Stevens et al. | 463/26 |
| 2008/0026848 A1 | 1/2008 | Byng | 463/42 |
| 2008/0033778 A1* | 2/2008 | Boss et al. | 705/9 |
| 2008/0038035 A1 | 2/2008 | Shuldman et al. | 400/76 |
| 2008/0045341 A1 | 2/2008 | Englman | 463/42 |
| 2008/0045342 A1 | 2/2008 | Crowder, Jr. et al. | |
| 2008/0045344 A1 | 2/2008 | Schlottmann et al. | 463/25 |
| 2008/0058105 A1 | 3/2008 | Combs et al. | |
| 2008/0064501 A1 | 3/2008 | Patel | 463/40 |
| 2008/0065590 A1 | 3/2008 | Castro et al. | |
| 2008/0066080 A1* | 3/2008 | Campbell | 719/314 |
| 2008/0076572 A1 | 3/2008 | Nguyen et al. | 463/42 |
| 2008/0090651 A1 | 4/2008 | Baerlocher | 463/27 |
| 2008/0096659 A1 | 4/2008 | Kreloff et al. | 463/39 |
| 2008/0102919 A1 | 5/2008 | Rowe et al. | |
| 2008/0102932 A1 | 5/2008 | Anderson et al. | |
| 2008/0104601 A1* | 5/2008 | Kaneko et al. | 718/103 |
| 2008/0108405 A1 | 5/2008 | Brosnan et al. | |
| 2008/0108433 A1 | 5/2008 | DiMichele et al. | 463/40 |
| 2008/0113764 A1 | 5/2008 | Soltys | 463/22 |
| 2008/0113773 A1 | 5/2008 | Johnson et al. | 463/25 |
| 2008/0119284 A1 | 5/2008 | Luciano, Jr. et al. | 463/42 |
| 2008/0127174 A1 | 5/2008 | Johnson | |
| 2008/0138773 A1 | 6/2008 | Lathrop | |
| 2008/0146337 A1 | 6/2008 | Halonen et al. | 463/42 |
| 2008/0153599 A1 | 6/2008 | Atashband et al. | 463/42 |
| 2008/0153600 A1 | 6/2008 | Swarna | 463/43 |
| 2008/0154916 A1 | 6/2008 | Atashband | 707/10 |
| 2008/0155665 A1 | 6/2008 | Ruppert et al. | 726/5 |
| 2008/0162729 A1 | 7/2008 | Ruppert | 709/249 |
| 2008/0171588 A1 | 7/2008 | Atashband | 463/20 |
| 2008/0171598 A1 | 7/2008 | Deng | 463/40 |
| 2008/0200255 A1 | 8/2008 | Eisele | 463/42 |
| 2008/0243697 A1 | 10/2008 | Irving et al. | 705/54 |
| 2008/0244565 A1 | 10/2008 | Levidow et al. | |
| 2008/0261699 A1 | 10/2008 | Topham et al. | |
| 2008/0261701 A1 | 10/2008 | Lewin et al. | 463/43 |
| 2008/0282293 A1* | 11/2008 | Frechter et al. | 725/58 |
| 2008/0287197 A1 | 11/2008 | Ruppert et al. | 463/42 |
| 2008/0293494 A1 | 11/2008 | Adiraju et al. | 463/42 |
| 2008/0300046 A1 | 12/2008 | Gagner et al. | |
| 2008/0305854 A1 | 12/2008 | Graham et al. | |
| 2008/0311971 A1 | 12/2008 | Dean | 463/20 |
| 2008/0313282 A1 | 12/2008 | Warila et al. | |
| 2008/0318671 A1 | 12/2008 | Rowe et al. | |
| 2008/0318685 A9 | 12/2008 | Oak et al. | 463/42 |
| 2009/0005176 A1 | 1/2009 | Morrow et al. | 463/43 |
| 2009/0005177 A1 | 1/2009 | Kishi et al. | |
| 2009/0011833 A1 | 1/2009 | Seelig et al. | 463/42 |
| 2009/0029775 A1 | 1/2009 | Ruppert et al. | 463/42 |
| 2009/0029776 A1* | 1/2009 | Ruppert et al. | 463/42 |
| 2009/0054139 A1 | 2/2009 | Anderson | |
| 2009/0061890 A1* | 3/2009 | Andreasson et al. | 455/456.1 |
| 2009/0063309 A1 | 3/2009 | Stephens | |
| 2009/0063624 A1* | 3/2009 | Nordstrom et al. | 709/203 |
| 2009/0115133 A1 | 5/2009 | Kelly et al. | 273/274 |
| 2009/0117994 A1 | 5/2009 | Kelly et al. | 463/25 |
| 2009/0118001 A1 | 5/2009 | Kelly et al. | 463/29 |
| 2009/0118005 A1 | 5/2009 | Kelly et al. | 463/31 |
| 2009/0118006 A1 | 5/2009 | Kelly et al. | 463/31 |
| 2009/0124329 A1 | 5/2009 | Palmisano | |
| 2009/0124392 A1 | 5/2009 | Ruppert et al. | 463/42 |
| 2009/0124394 A1 | 5/2009 | Swarna | 463/43 |
| 2009/0125603 A1 | 5/2009 | Atashband et al. | 709/207 |
| 2009/0131144 A1 | 5/2009 | Allen | 463/20 |
| 2009/0131163 A1 | 5/2009 | Arbogast et al. | 463/29 |
| 2009/0132720 A1 | 5/2009 | Ruppert et al. | 709/231 |
| 2009/0170594 A1 | 7/2009 | Delaney et al. | 463/25 |
| 2009/0176556 A1 | 7/2009 | Gagner et al. | 463/25 |
| 2009/0176580 A1 | 7/2009 | Herrmann et al. | 463/43 |
| 2009/0181776 A1 | 7/2009 | Deng | 463/42 |
| 2009/0239667 A1 | 9/2009 | Rowe et al. | |
| 2009/0240762 A1* | 9/2009 | Martin | 709/201 |

(56) References Cited

U.S. PATENT DOCUMENTS

| | | | |
|---|---|---|---|
| 2009/0253483 A1 | 10/2009 | Pacey et al. | 463/20 |
| 2009/0270170 A1 | 10/2009 | Patton | 463/36 |
| 2009/0275394 A1 | 11/2009 | Young et al. | 463/25 |
| 2009/0275400 A1 | 11/2009 | Rehm et al. | 463/27 |
| 2009/0275401 A1 | 11/2009 | Allen et al. | 463/29 |
| 2009/0275402 A1 | 11/2009 | Backover et al. | 463/29 |
| 2009/0276341 A1 | 11/2009 | McMahan et al. | 705/30 |
| 2009/0298583 A1 | 12/2009 | Jones | 463/29 |
| 2009/0307069 A1 | 12/2009 | Meyerhofer | 705/14.12 |
| 2010/0016067 A1 | 1/2010 | White et al. | 463/25 |
| 2010/0016068 A1 | 1/2010 | White et al. | 463/25 |
| 2010/0029385 A1 | 2/2010 | Garvey et al. | 463/35 |
| 2010/0048291 A1 | 2/2010 | Warkentin | 463/25 |
| 2010/0058320 A1 | 3/2010 | Milligan et al. | |
| 2010/0062838 A1 | 3/2010 | Nguyen et al. | |
| 2010/0093440 A1 | 4/2010 | Burke | |
| 2010/0093441 A1 | 4/2010 | Rajaraman et al. | 463/42 |
| 2010/0130280 A1 | 5/2010 | Arezina et al. | 463/20 |
| 2010/0151926 A1 | 6/2010 | Ruppert et al. | 463/1 |
| 2010/0161798 A1 | 6/2010 | Ruppert et al. | 709/225 |
| 2010/0210353 A1 | 8/2010 | Gagner et al. | |
| 2010/0217837 A1* | 8/2010 | Ansari et al. | 709/218 |
| 2010/0231790 A1* | 9/2010 | Ansari et al. | 348/552 |
| 2010/0241711 A1* | 9/2010 | Ansari et al. | 709/205 |
| 2010/0248842 A1 | 9/2010 | Ruppert | 463/42 |
| 2010/0277109 A1* | 11/2010 | Crookham et al. | 315/363 |
| 2011/0009184 A1 | 1/2011 | Byng | 463/20 |
| 2011/0040251 A1* | 2/2011 | Blomquist et al. | 604/151 |
| 2011/0124417 A1 | 5/2011 | Baynes et al. | 463/43 |
| 2011/0161948 A1 | 6/2011 | Hilbert | |
| 2011/0179409 A1 | 7/2011 | Yoseloff et al. | |
| 2011/0269534 A1 | 11/2011 | Kelly et al. | |
| 2012/0110649 A1 | 5/2012 | Murphy | |
| 2012/0203692 A1 | 8/2012 | Oliphant et al. | |

FOREIGN PATENT DOCUMENTS

| | | |
|---|---|---|
| GB | 2 380 143 A | 4/2003 |
| WO | 02/05914 A1 | 1/2002 |
| WO | 2005/035084 | 4/2005 |
| WO | 2007/033207 A2 | 3/2007 |

OTHER PUBLICATIONS

Bing search q=upgrade+gaming+machine+software+ca Jun. 11, 2014.*

Bally Technologies, Inc., iVIEW, http://ballytech.com/systems/product.cfm?id=9, download date Nov. 6, 2007, 2 pages.

Bally TMS, "MP21—Automated Table Tracking/Features," 2 pages, Nov. 2005.

Bally TMS, "MPBacc—Specifications/Specifications," 2 pages, Nov. 2005.

Bally TMS, "MPLite—Table Management System/Features," 2 pages, Nov. 2005.

Burke, A., "Tracking the Tables," reprinted from *International Gaming & Wagering Business*, Aug. 2003, 4 pages.

Gros, R., "All You Ever Wanted to Know About Table Games," reprinted from *Global Gaming Business*, Aug. 1, 2003, 2 pages.

MagTek, "Port Powered Swipe Reader," Technical Reference Manual, Manual Part No. 99875094 Rev 12, Jun. 2003, 20 pages.

Mikohn, "Mikohn Tablelink—The Industry's Premier Table Tracking Solution Delivers Improvements Straight to the Bottom Line," 2 pages, before Jan. 1, 2004.

Terdiman, D., "Who's Holding the Aces Now?", reprinted from *Wired News*, Aug. 18, 2003, 2 pages.

Winkler, C., "Product Spotlight: MindPlay," reprinted from *Gaming and Leisure Technology*, Fall 2003, 2 pages.

Singh et al., U.S. Appl. No. 12/271,337, filed Nov. 14, 2008, 35 pages.

Crowder, U.S. Appl. No. 12/271,736, filed Nov. 14, 2008, 35 pages.

Atashband et al., U.S. Appl. No. 12/620,402, filed Nov. 16, 2009, 46 pages.

Ruppert et al., U.S. Appl. No. 12/620,404, filed Nov. 16, 2009, 70 pages.

International Search Report, mailed Dec. 3, 2009, for PCT/US2009/042161, 3 pages.

Written Opinion, mailed Dec. 3, 2009, for PCT/US2009/042161, 4 pages.

Gwyddion User Guide, "False Color Mapping: Chapter 3. Getting Started," retrieved from URL=http://sourceforge.net/projects/gwyddion/files/user-guide/2007-06-28/gwyddion-user-guide-xhtml1-2007-06-28.tar.gz/download, retrieved on Nov. 21, 2012, 2 pages.

Office Action for corresponding Chinese application No. 200980124639.8, dated Sep. 4, 2012, with English summary, 18 pages.

Patent Examination Report for corresponding Australian application No. 2009243039, dated Sep. 20, 2013, 4 pages.

Rejection of Patent Application for corresponding Chinese application No. 200980124639.8, dated Jun. 24, 2013, with English summary, 17 pages.

Requirements document, "Game Authentication Terminal Program (GAT3)," to Gaming Standards Association, Aug. 2005, 27 pages.

Second Office Action for corresponding Chinese application No. 200980124639.8, dated Feb. 4, 2013, with English summary, 17 pages.

Standards document, "Technical Standards for Gaming Devices and On-Line Slot Systems," to Nevada Gaming Commission and State Gaming Control Board, Aug. 17, 2005, 15 pages.

Third Office Action for corresponding Chinese application No. 200980124639.8, dated Apr. 22, 2013, with English summary, 15 pages.

"BOB and LDAP, Version 0.2," Gaming Standards Association, Fremont, California, 7 pages, Oct. 26, 2003.

"GSA Point-to-Point SOAP/HTTPS Transport and Security Specification v1.0.3," Gaming Standards Association Transport Technical Committee, 16 pages, Jun. 5, 2007.

Bulavsky, J., "Tracking the Tables," accessed Dec. 21, 2005, URL = http://www.ascendgaming com/cj/vendors_manufacturers_table/Trackin916200411141AM.htm, 5 pages.

Hung et al., "Performance Evaluation of the Least Conflict Sharable Spreading Code Assignment Algorithm," IEEE, 1996, 5 pages.

Olesiejuk, "Discovery Services for Gaming Devices on a Casino Floor," Gaming Standards Association, 3 pages, Mar. 12, 2007.

* cited by examiner

USER INTERFACE FOR MANAGING NETWORK DOWNLOAD AND CONFIGURATION TASKS

BACKGROUND

1. Technical Field

The present disclosure is directed to the management of networked devices, including networked electronic gaming machines.

2. Description of the Related Art

A system and method for downloading and configuring software for networked devices, particularly electronic gaming machines (EGM), is found in published PCT Application No. PCT US/2006/035556, which is owned by the assignee of the present application and is incorporated herein in its entirety. To briefly summarize, the disclosed network system allows a casino operator to define changes to software inventory (e.g., via download) and to schedule configuration changes. For example, a casino operator can define default payouts and denominations, schedule recurring overrides for weekends, and schedule a one-time override for a holiday or casino promotion.

Ideally, changes are made without casino operator interaction or attendance to individual machines on the gaming floor each time a new configuration is needed. The configuration changes are preferably communicated during the background operation of the EGM without affecting game play, and the changes are applied at a designated convenient time. Thus, the EGM do not need to be placed in an inactive state prior to downloading configuration changes.

The network system also includes a method of recognizing when an EGM needs data downloads or configuration. These activities are coordinated through the network to avoid conflicts. For example, configuration of an EGM will be held until the downloads for the EGM are completed. In another example, the network host is configured to automatically restore data modules and to configure an EGM if the EGM has been RAM-cleared or has been offline. Thus, an operator can monitor and manage a group of EGMs from a single terminal, eliminating the need for slot technicians to collect configuration data and to manually reconfigure each EGM.

In accordance with a method of the foregoing system, a host downloads a package to the EGM that is then authenticated and either installed immediately or scheduled for later installation. Various methods of assignment conflict analysis and resolution are also provided, although conflicts typically occur for assignments of the same type (e.g., download and configuration). Such conflicts are avoided by running the download process before the configuration process, with the exception that data related to the host and owner information will supersede other assignments. Conflicts can also arise as a result of an EGM being a member of different "collections" where membership may vary depending on the EGM configuration at a moment in time. For example, switching an EGM from a five cent denomination to a twenty-five cent denomination may switch the membership of the EGM to another collection (e.g., all twenty-five cent EGMs). Thus, the network system includes various methods to resolve situations where EGMs are scheduled for management upgrades or updates to provide a consistent method of conflict avoidance.

Hence, scheduling assignments must be done with care to avoid unintentional conflicts or overlapping timeslot assignments that can jeopardize the configuration process for one or more EGMs. Scheduling of different tasks over a period of time in system applications has generally required a multiple step process that includes setting up the tasks in the order in which they are to be performed, how often the tasks are to be performed, and creating a graphical user interface for creating and editing the schedule. A timer also needs to be included for use in initiating and terminating scheduled tasks. Classifications of tasks also need to be created in order to insure coordination of equipment configuration.

In a gaming system network, hundreds of EGMs can be involved, requiring constant scheduling of downloads and configurations, monitoring of the process, and resolving any conflicts that may arise due to interruptions in the schedule, breakdowns in the EGMs, and casino activities that may affect use of the EGMs, such as specials, holiday events, and the like.

BRIEF SUMMARY

In accordance with one embodiment of the present disclosure, a user interface for management of network operations, including the operation of networked devices, such as electronic gaming machines, is provided. The interface is implemented by a computer-readable medium whose contents enable a computing device to display on a display device a user interface by performing a method that includes generating a display of the user interface that includes operation assignment interfaces, each assignment interface providing information about an operation, a calendar interface that provides at least date and time information, and at least one graphical linking indicator that provides visual relational information of related operations, the user interface configured to enable scheduling of operations through the assignment interfaces on the calendar interface.

In accordance with another aspect of the present disclosure, the contents of the computer-readable medium are instructions that when executed cause the computing device to perform the method.

In accordance with another aspect of the present disclosure, the assignment interface provides information about at least one of an assignment identifier, status of the related operation, an error indicator, and a start time. In one embodiment, the assignment interface includes a user-activated tooltip.

In accordance with another aspect of the present disclosure, the calendar interface includes a timeline displaying at least one of a date and time, and a graphical indicator interposed on the timeline to indicate at least one of current date and time.

In accordance with another embodiment of the present disclosure, a system is provided that includes a network of devices, a display device, and a processor coupled to the network of devices and the display device and configured to generate a user interface on the display device for display and user management of network operations, the user interface including assignment interfaces, each assignment interface providing information about an associated operation, a calendar interface on which the assignment interfaces are displayed, the calendar interface providing at least date and time information, and at least one graphical linking indicator that provides visual relational information of related operations.

In accordance with another embodiment of the present disclosure, a method of providing a user interface for management of network operations is provided, the method including presenting a time line along a time line axis with information that is indicative of at least one of dates or time, and for each of a number of operations, presenting a respective assignment icon with a start point of the assignment icon positioned along the time line axis at a point that is indicative of a time that an operation represented by the assignment icon is scheduled to start.

In accordance with another embodiment of the present disclosure, presenting a linking icon between the assignment icons that represent the at least two operations that reoccur over time includes presenting a line that extends from at least proximate a finish of a first one of the assignment icons to at least proximate a start of a second one of the assignment icons.

In accordance with another embodiment of the present disclosure, the method includes presenting a termination marker at a point along the time line axis indicative of an extended time, and presenting an extension icon proximate one of the assignment icons where a termination time of the assignment represented by the assignment icon has been extended.

As will be readily appreciated from the foregoing, the present disclosure provides an intuitive user interface tool for operators to view, monitor status, and manipulate network operations, such as assignments for download and configuration of networked devices, including EGMs.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings.

In the drawings, identical reference numbers identify similar elements or acts. The size and relative positions of elements in the drawings are not necessarily drawn to scale. For example, the shapes of various elements are not drawn to scale, and some of these elements are arbitrarily enlarged and positioned to improve drawing legibility. Further, the particular shapes and the elements as drawn are not intended to convey any information regarding the actual shape of the particular elements and have been solely selected for their ease and recognition in the drawings.

DETAILED DESCRIPTION

Figure 1:
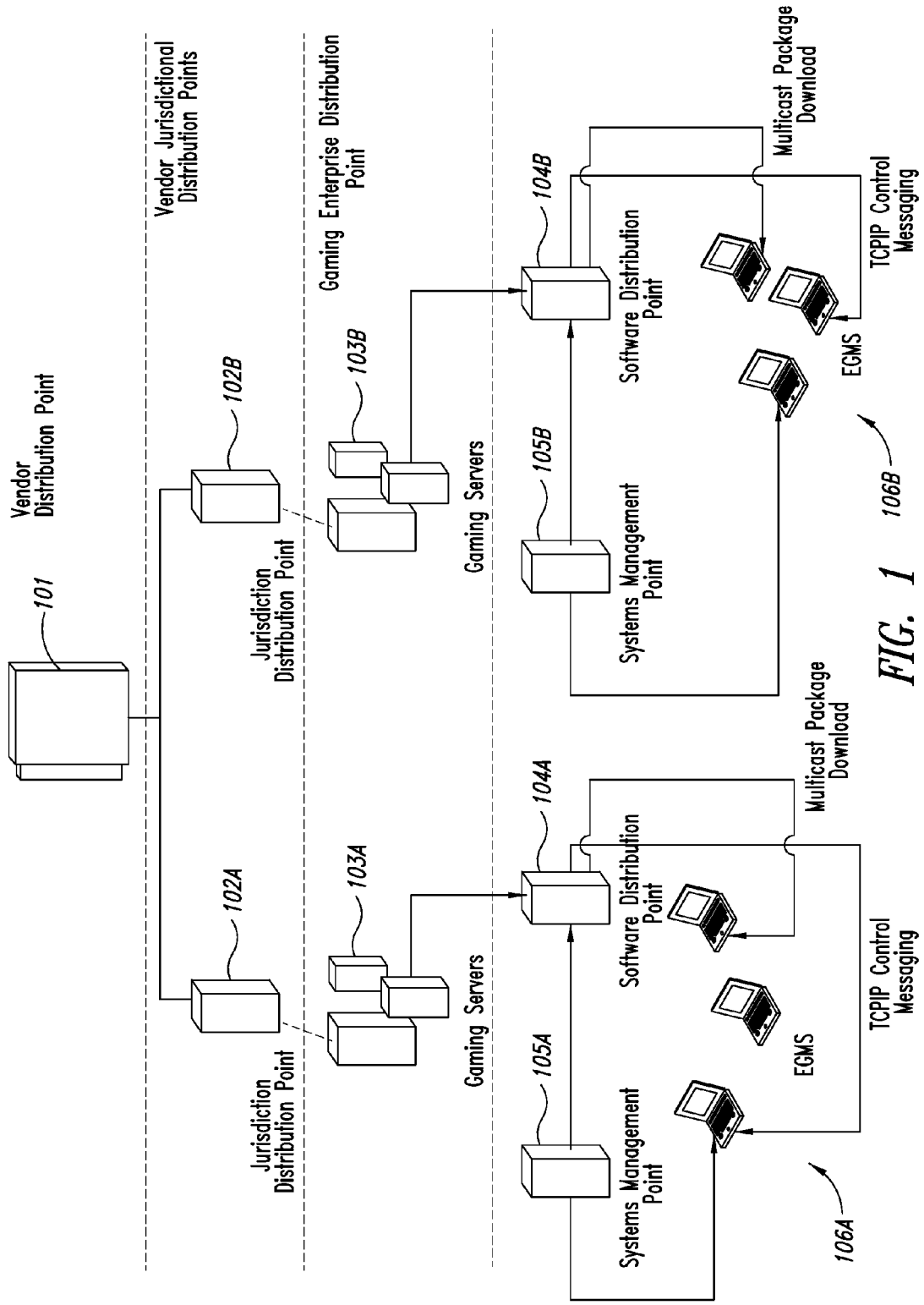
FIG. 1 illustrates an embodiment of a known gaming network that may be used with the user interface of the present disclosure.

In the following description, certain specific details are set forth in order to provide a thorough understanding of various embodiments of the disclosure. However, one skilled in the art will understand that the disclosure may be practiced without these specific details. In other instances, well-known structures associated with computers, computer networks, data structures, databases, networks such as the Internet, user interfaces and graphical user interfaces, and electronic game machines have not been described in detail to avoid unnecessarily obscuring the descriptions of the embodiments of the present disclosure.

Unless the context requires otherwise, throughout the specification and claims that follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The user interface disclosed herein is described in the context of managing download and configuration tasks, jobs, assignments, and the like (referred to herein without limitation as assignments) for at least one electronic game machine (EGM) and preferably for a network of EGMs. However, it is to be understood that the user interface of the present disclosure can be adapted for use in other systems and networks that manage multiple machines, including without limitation computers, cash registers, remote teller machines, ATM machines, vending machines, toll booths, security systems, and ticket dispensing machines.

In the context of the present disclosure, various network systems and user interface methods for managing networked gaming machines are disclosed herein. The operational environment of the present interface system is described in the pending application referenced above, PCT US/2006/035556, of which a portion of the description is set forth below in conjunction with FIGS. 1-5 from the above-referenced application.

The disclosed system supports data downloads and configuration of gaming machines such as, but not limited to, electronic gaming machines (EGMs). With the network system, a casino operator may define a collection of EGMs, assign modules to one or more collections of EGMs, assign configuration changes to one or more collections of EGMs, and schedule all assignments.

The system permits some or all of the software that is to be run on an EGM to be centrally stored in a software distribution library located on one or more servers. The software can be sent over a network (such as an Ethernet network) as desired for initial set up of an EGM, as updating of an EGM, game replacement, configuration, or any other desired purpose.

The system utilizes multicasting to download software packages to the EGMs in the background, even while full game play is ongoing. The server does a single multicast transfer of one or more packages to all target machines. Each EGM tracks the packages and notes missing, corrupted, or dropped packets. In one embodiment, the server receives requests from all EGMs for packets to resend and again multicasts them to all EGMs, regardless of which EGM requested which packet. The individual EGMs accept needed missing packets and ignore other re-broadcast packets. It should be noted that the system is not limited to multicast transmissions but may use HTTP, HTTPS, FTP, SFTP, and other transmission protocols.

It should be noted that the term EGM is intended to encompass any type of gaming machine, including hand-held devices used as gaming machines such as cellular based devices (e.g. phones), PDAs, or the like. The EGM can be represented by any network node that can implement a game and is not limited to cabinet based machines. The system has equal applicability to gaming machines implemented as part of video gaming consoles or handheld or other portable devices. In one embodiment, a geo-location device in the handheld or portable gaming device may be used to locate a specific player for regulatory and other purposes. Geo-location techniques that can be used include by way of example, and not by way of limitation, IP address lookup, GPS, cell phone tower location, cell DD, known Wireless Access Point location, Wi-Fi connection used, phone number, physical wire or port on client device, or by middle tier or backend server accessed. In one embodiment, GPS and biometric devices are built within a player's client device, which in one embodiment, comprises a player's own personal computing device, or provided by the casino as an add-on device using USB, Bluetooth, IRDA, serial or other interface to the hardware to enable jurisdictionally compliant gaming, ensuring the location of play and the identity of the player. In another embodiment, the casino provides an entire personal computing device with these devices built in, such as a tablet type computing device, PDA, cell phone or other type of computing device capable of playing system games.

An embodiment of a network that may be used with the system is illustrated in FIG. 1. The software distribution network consists of a top level vender distribution point 101 that contains all packages for all jurisdictions, one or more Jurisdiction distribution points 102A and 102B that contain regulator approved production signed packages used within that jurisdiction or sub-jurisdiction, one or more Software Management Points 103 A and 103B to schedule and control the downloading of packages to the EGM and a one or more Software Distribution Points 104A and 104B that contain regulator approved production signed packages only used in the gaming establishment that it supports. The Software Distribution Points (SDPs) 104A and 104B can communicate with Systems Management Points (SMPs) 105A and 105B, respectively as well as directly to one or more EGMs 106A and 106B. (The communication between SDP and SMP is optional. A benefit is to permit the SMP and the user access to the catalogue of software packages available on the SDP). The system allows for rapid and secure distribution of new games and OS's from a centralized point. It makes it possible to update and modify existing gaming machines with fixes and updates to programs as well as providing modifications to such files as screen images, video, sound, pay tables and other EGM control and support files. It provides complete control of gaming machines from a centralized control and distribution point and can minimize the need and delay of human intervention at the EGM.

In one embodiment, a 1 GB compact flash card will initially be used as the storage media in the EGMs for OS and download package storage. A second compact flash will be used for the storage of the production game as it exists today. The OS compact flash will be partitioned into production, backup, and download areas. The production area contains the active OS and game management software used to allow the playing of games on the EGM. This part of storage will have all the file integrity checking and validation performed on it. The other areas will be used to store backup software and data, new download packages, installation of the new packages and saving of NVRAM, counters, random number data and other secure information in an encrypted data format. Software downloads will be scheduled by gaming personnel via the SMPs. The SMP notifies the individual gaming machines they have been scheduled to receive a download package from a specific vendor Software Distribution Point (SDP). The EGM shall then request the SDP to start sending the download package to it.

The system solves the network bandwidth usage problem by using a multicast network protocol, which the SDP uses to broadcast the transfer to multiple EGM's simultaneously. The SDP will send a single transfer to a defined set of EGM's, thereby using a fraction of the network bandwidth when compared to the point-to-point strategy. If there are X groups of EGM's, with each group consisting of Y EGM's, then the following calculations provide a general sense of reduced network bandwidth usage:

Multicast: X * transferSize
Point-to-point: (X * Y)* transferSize
Gross Improvement: 1/Y network usage with multicast.

The system includes a recovery scheme to accommodate transmission error or reception error of the package. This recovery scheme allows each EGM to report missing pieces (packets) where either not received or received with errors (data corruption). The SDP logic can accumulate a list of missing packets and the corresponding EGM's, and use the multicast protocol to resend the missing packets.

The specific packages that are transferred are specified by the EGM. The EGM makes requests to the SDP using a point-to-point protocol. The SDP may not service these requests immediately, so the EGM is permitted to operate while waiting for the transfer and during the transfer. The EGM is responsible for logging transfers and checking the validity of the completed transfer. This log can be used to reconcile the package content of the EGM at any given time. Additionally, the SDP will log transfer activity and provide a means to cross check the package content of an EGM.

An EGM validates transferred packages using a digital signature. This digital signature provides authentication of the package itself regardless of the specific SDP server that provided it, and is used to determine if the package incurred any transmissions errors. If an EGM is unable to validate a package, then the package will not be installed or otherwise used.

The system includes technology necessary to determine if an EGM contains packages necessary to use a new package (package dependencies). If a given package-A requires additional packages, package-B and package-C, to operate on the EGM, the dependencies can be determined from a package header contained within package-A. The SMP can then determine if the EGM already contains the dependent packages, package-B and package-C, before requesting that package-A be transferred to the EGM. Similarly, the SMP can automatically select the dependent packages to be transferred in addition to the original package-A, thus fulfilling the dependencies of package-A. This aspect of the system provides a level of assurance that the packages transferred can actually be used by the EGM.

The system includes technology necessary to determine if a package's dependent hardware components (components) are available on the EGM. If package-X requires component-Y and component-Z, the SMP can read the components of the EGM and use this information for component dependency checking. If a package's required component dependencies are available on the EGM, then the package transfer to the EGM will be permitted; otherwise, the package transfer will not be permitted. This aspect of the system provides a level of assurance that the packages transferred can actually be used by the EGM.

The ability to transfer software directly to the EGM provides additional alternatives when installing a new EGM on the casino floor. An EGM that is manufactured and placed directly on the casino floor can be initially loaded with a boot-strap media (EPROM, CD-ROM, Compact Flash, etc.) that can boot the EGM and prepare communications before requesting new packages to install. Two boot-strap methods may be used to transfer software to an EGM. Both methods require minimal configuration of an EGM before the boot-strap process can be completed. Minimal configuration consists of the following:

1) A unique network IP Address for the EGM. This can be provided by a DHCP system, or assigned to the EGM via operator configuration.

2) A unique EGM identifier that is derived from the EGM hardware (such as network card MAC address) or assigned to the EGM via operator configuration.

3) An address of the SDP network server to make transfer requests of. This can be a hard-coded default address that may be overridden via operator configuration.

The simple boot-strap mode requires that EGM is also configured with the necessary options to locate the SMP network server. This can be a hard-coded default address that may be overridden via operator configuration. This address is used by the EGM to locate the SMP server, which can then assign new packages to the EGM for transfer. In one embodiment, the EGM and its associated peripherals can be identified using a scheme such as is described in U.S. patent application Ser. No. 11/319,034 entitled "Device Identification" and incorporated in its entirety herein by reference. In this embodiment, during start-up, a device sends its MAC address out on the network. A local switch collects MAC and IP addresses for the devices connected to it. Periodically, the switch transmits raw Ethernet frames, USB packets, or TCP packets containing tables of devices and associated MAC/IP addresses. When a device receives information about another device, the device may attempt communication with that device. First, a verification procedure is used to validate the devices. Subsequently, communication is possible between the devices.

The advanced boot-strap mode involves the EGM requesting a default boot-strap package from the SDP. The package name for this boot-strap package is predefined and known to both the EGM and the SDP. This boot-strap package contains configuration files that identify the default software packages and configuration data. The boot-strap package can be customized for the specific installation (casino) and stored on the SDP. This way all EGM's will request the predefined boot-strap package, the SDP will transfer the boot-strap package to the EGM, and the EGM will process the boot-strap package. When the EGM processes the boot-strap package, the EGM can read the SMP address, default EGM OS package, and other packages such as default peripheral firmware packages. At this point the EGM can request these packages from the SDP, and the SDP will begin transferring the default packages to the EGM, ultimately ending with an EGM ready for configuration.

Figure 2:
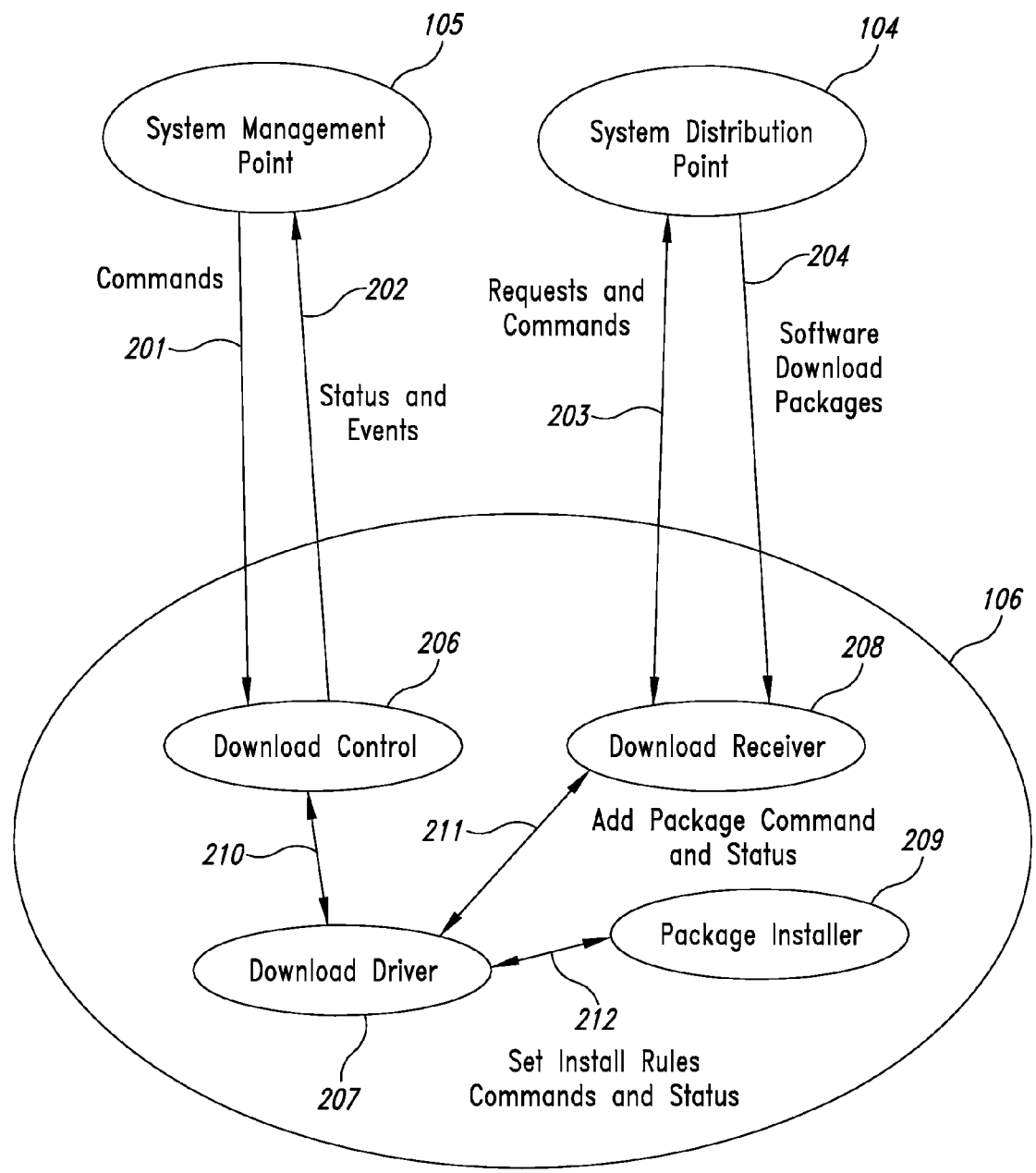
FIG. 2 illustrates an overview of a known download interaction.

FIG. 2 illustrates an overview of download interaction between the System Management Point 105, EGM 106, and Software Distribution Point 104. The design consists of a download device driver which provides the central control logic and logic. It interfaces with the Download Class (which may be G2S or any other protocol) and a download control thread. The download control thread controls requesting and downloading packages from the download distribution point server.

In operation, the System Management Point 105 sends package commands and requests to the Download Control 206 of EGM 106 to tell it to add and delete packages, install packages and request information about packages and installed modules. The Download Control 206 will filter these requests and pass then to the Download Driver 207 for processing. Requests to add packages are then given to the Download Receiver Process 208 which then opens communications with the Software Distribution Point 104. The Download Receiver Process 208 receives the package data from the Software Distribution Point 104 via a multicast (or any other defined transmission protocol) link 204 in multiple packets and assembles the package in compact flash. Once all packets of the package have been received, the package data is verified using a SHA-I verification string passed in the package header. The appropriate status and package state information shall be passed back to the Download Driver 207 which passes it to the Download Control 206 for logging and passing back to the System Management Point.

Download Driver 207

The download driver is installed when the EGM system is started. It's primary functions are to:

1—Initialize package and control information as stored on the compact flash.

2—Process commands to add packages and install rules from the Download Control 206.

3—Supply the Download Control 206 with list and status information and download and install events.

4—Queue add package requests for the Download Receiver process 208 and pass them to the Download Receiver 208 via a read 211 to the driver.

5—Update package the status and error conditions of packages and install rules and pass them back to the Download Control Process 206.

Download Control Thread 206

The Download Control Process 206 is either a thread running within the game manager context or a standalone process when there is no game manager running on the system. It's primary tasks are:

1—Receives download commands

2—Passes the commands that it will not process on to the download driver 207 for delivery to the Download Receiver process 208 and the Download Installer process 209.

3—Receive download and install status from the driver and log in the appropriate log files on the EGM 106.

4—Supply the log information and package, install rule and module lists to the System Management Point 105 when requested.

Download Receiver Process 208

The Download Receiver Process 208 is responsible for communications between the EGM 106 and the Software Distribution Point 104. It's primary functions are:

1—Receive add package requests from the Download Driver 207.

2—Open a TCPIP link to the Software Distribution Point 104 and request the package defined within the add package request be sent to the EGM 106.

3—Open a multicast communications port specified by the Software Distribution Point 104 and receive the requested package in multiple packet format.

4—Assemble the packets of the package into a single file.

5—Request any missed or missing packets be resent.

6—Verify the package data by calculating a SHA-I value and matching that against the SHA-I validation string passed in the package header.

7—Send back status and error information of the package receive process to the Download Control Process 206 via the Download Driver 207.

Download Package Installer Process 209.

The Download Package Installer Process 209 is responsible for installing the packages that are downloaded from the Software Distribution Point 104. It is notified of when to start installing a downloaded package when a set install rule command is sent from the Systems Management Point 105. It receives this command via a read to the Download Driver 207. The basic functions of the Download Package Installer Process 109 are:

1—Parse the set install rules to determine how to process the package.

2—Disable the EGM 106 based on the instructions in the set install rule command.

3—Install the package using the command file sent as part of the download package.

Figure 3:
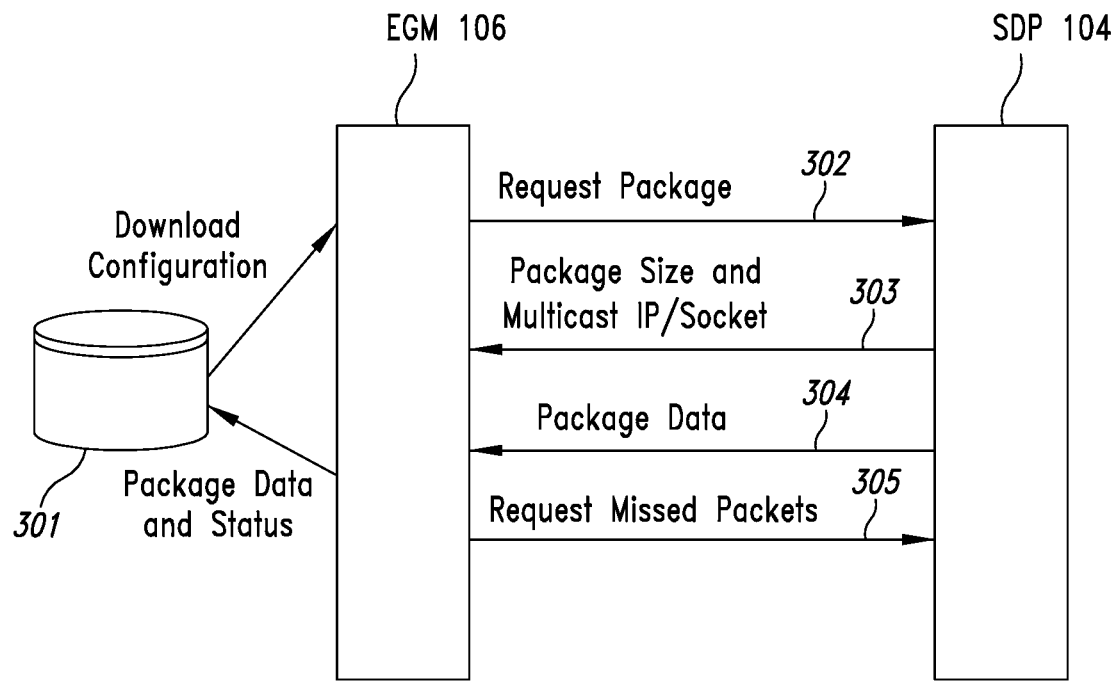
FIG. 3 illustrates an overview of EGM Startup message flow.

4—Clear NVRAM as instructed by the install rules. [0089] 5—Reboot the EGM 106 as instructed by the set install rules. [0090] 6—Pass back status and error information via the Download Driver 207. [0091] EGM Initialization FIG. 3 illustrates an overview of EGM startup message flow. EGM 106 sends a message 302 to SDP 104 requesting a package. SDP 104 replies with a message 303 indicating package size and the multicast IP/Socket that will be used for transmission. Message 304 from SDP 104 to EGM 106 is the package data itself. If necessary, EGM 106 can request missed packets by sending a message 305.

As noted above, the system uses multicasting to send packages to multiple EGMs. When packets are missed and requested by an EGM, SDP 104 collects a number of requests and sends out multicasts of all missed packets to all of the EGMs. If a particular EGM does not need one of these re-broadcast packets, it is ignored. Otherwise, the EGM accepts the re-broadcast packet and uses it to complete the package transmission.

Download Driver

In the interface between the download driver 207 and the download processes, all set status, set error information and command information is passed to the driver 207 via an IOCTL call. The processes use the read interface to get processing instructions from the driver 207. The Download Receiver 208 uses the read interface to get add package requests, the Download Installer Process 209 uses the read to obtain set install rule requests, and the Download Control Process 206 uses the read interface to receive the status and error information from the Receiver and Install processes.

/dev/download is a loadable module, "device driver", that is loaded as the system comes up. (It is a Linux loadable module in one embodiment). DI_mit_module( ) is the first routine to gain control when the module is loaded. It will:

1—Allocate the download buffer used to store Download Class messages, (e.g. the G2S or other protocol)

2—Register the download support as a Linux kernel device.

3—Initialize the read queues from the processes that communicate with the driver.

4—Initialize the storage area for package and set install rules that may be received.

Once the driver has been installed and initialized, all further actions will controlled by the ioctl and read function entry points into the driver. The ioctl entry point, DL_ioctl( ), will process all the System Management Point 105 requests passed through the Download Control Process received from the download class. The DLjreadQ entry point services all the read requests from:

The Download Control Process 206 for packages status and error,

The Download Receiver process 208 to pass add package requests.

The Download Installer 209 to receive set install rule request.

Figure 4:
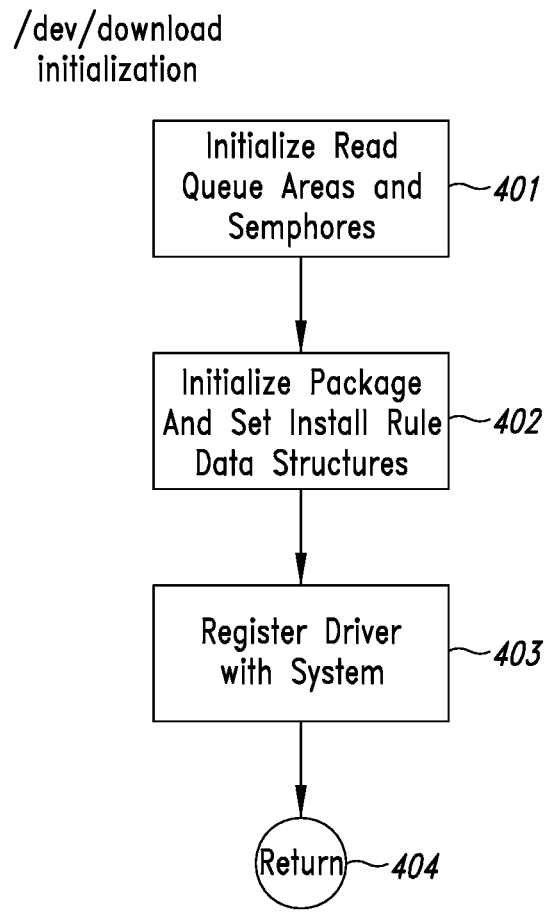
FIG. 4 depicts the logic flow of /dev/download driver initialization.

FIG. 4 depicts the logic flow of /dev/download driver initialization. At step 401 the Read Queue areas and semaphores are initialized. At step 402 the package is initialized and the Install Rule Data Structures are set. At step 403 the driver is registered with the system and at step 404 the system returns.

Figure 5:
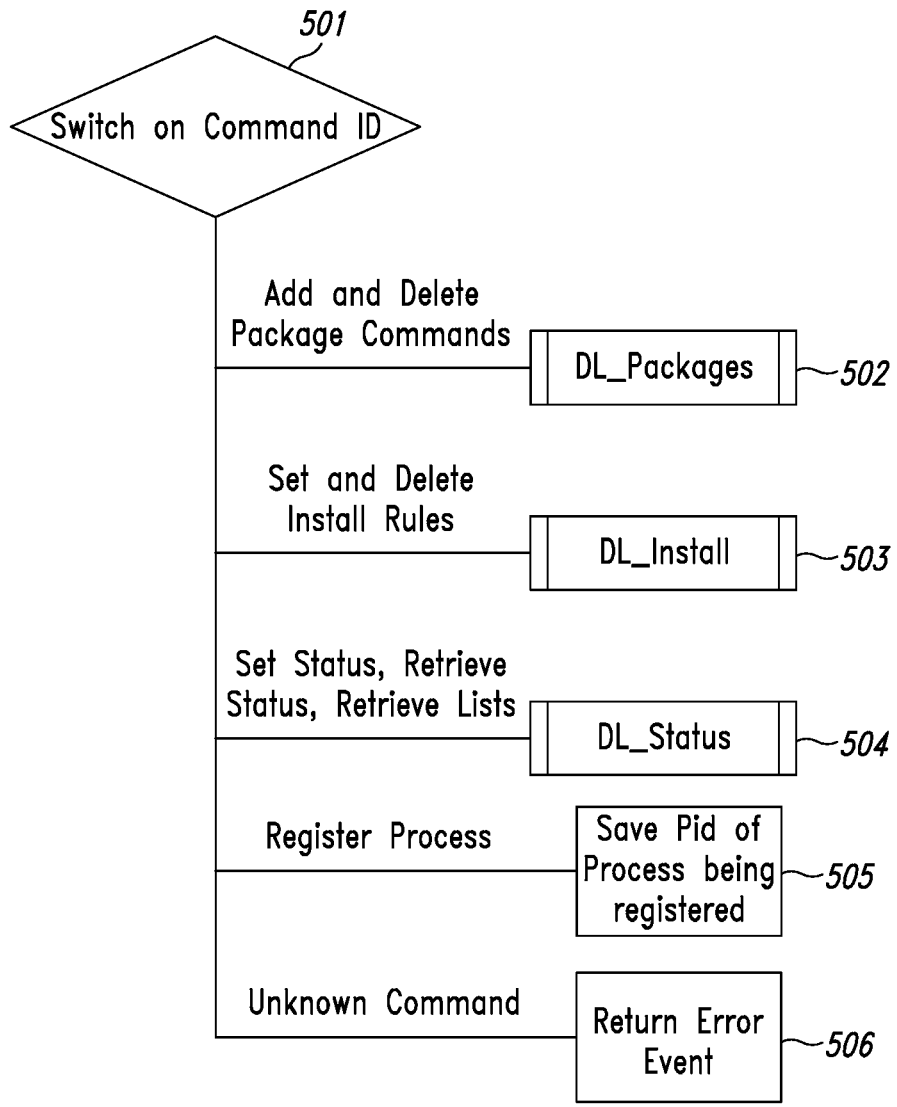
FIG. 5 is a flow diagram illustrating a routine to validate download requests and pass control to the proper handler function.

Once the /dev/download driver is installed and initialized, the dl_ioctl( ) driver 207 serves as the interface to the Download Control Process 206, and the Receiver 208 and Install 209 processes. All requests from System Management Point 105 are passed through Download Control Process 206 and either passed onto the driver 207 to be processed, or in the case of module and log requests, processed within the Download Control Process 206 itself. The dl_ioctl( ) is a command ID to determine what to do with the specific request. FIG. 5 is a flow diagram illustrating a routine to validate download requests and pass control to the proper handler function.

At step 501 shown in FIG. 5, the particular switch that is set on the Command ID is examined so that the request from the SMP 105 can be routed to the correct handler. Add and delete Package commands are provide to DL_Packages 502. Set and Delete Install rules are passed to DL_Install 503. Set Status, Retrieve Status, Retrieve List commands are sent to DL_Status 504. Register processes are sent to block 505 where the Pid of the Process being registered is saved. Unknown commands return an error event at 506.

The scheduling and management of the various operations associated with the foregoing download and configuration processes is accomplished via the user interface (UI) shown in FIG. 6. Generally the UI 610 is adapted for display on a display device, such as a display screen, CRT, computer screen, television, handheld displays, PDA, and the like. In one embodiment the UI 610 is implemented from instructions or executable code stored on a computer readable medium, such as a processor described above in connection with FIGS. 1-5. The UI 610 enables a user to display information about the operation of selected devices coupled to the network, particularly with respect to scheduled operations presented on the user interface, and to control the scheduling of the operations, such as start time and cancellation thereof.

In one embodiment, a system is provided that generally includes a network of devices, such as EGMs, a display device, and a processor coupled to the network of devices and the display device and configured to generate a UI 610 (shown in FIG. 6) on the display device for display and user management of network operations. The UI 610 includes assignment interfaces, with each assignment interface providing information about an associated operation, a calendar interface on which the assignment interfaces are displayed, the calendar interface providing at least date and time information.

Figure 6A:
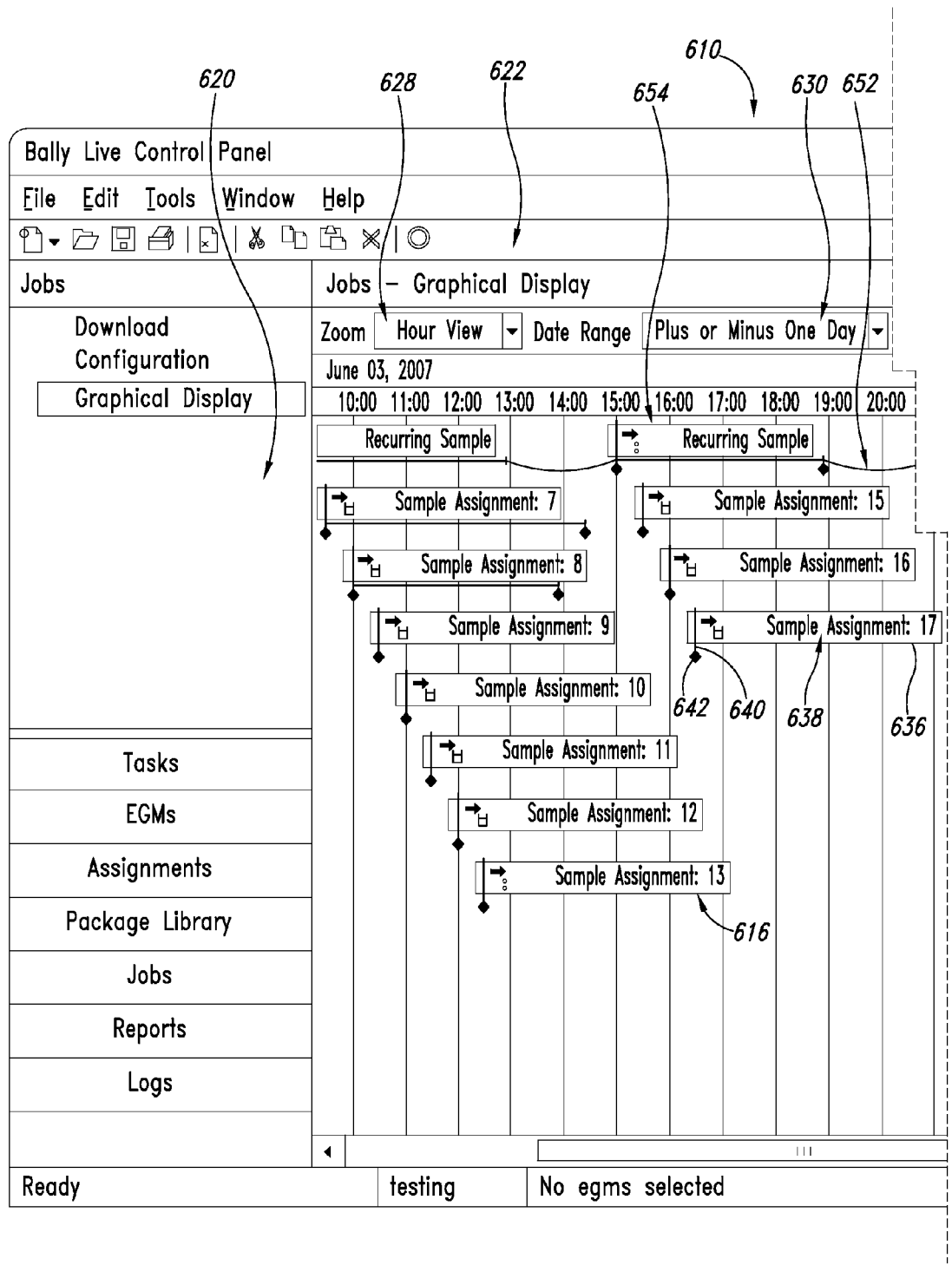
FIGS. 6A and 6B illustrate a user interface for managing download and configuration assignments in the EGM network.
Figure 6B:
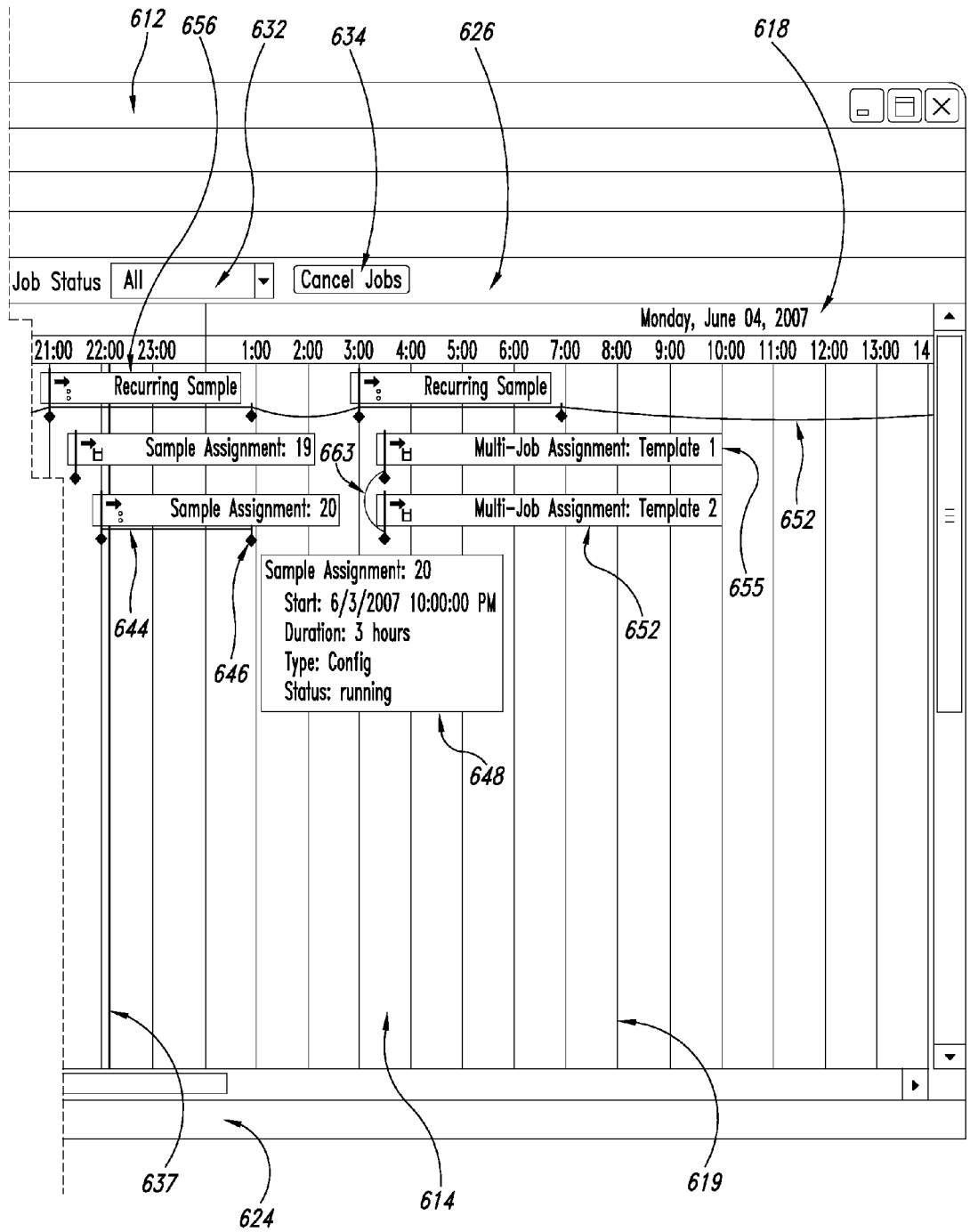

The UI 610 as shown in FIGS. 6A and 6B is encompassed in a display area 612 that includes a calendar interface 614 and a plurality of assignment interfaces 616 displayed thereon. Ideally the calendar interface 614 includes at least one timeline header 618 that presents at least one of a date or a time or both date and time. In the illustrated embodiment the timeline 618 is presented horizontally across the top of the calendar interface 614 with vertical lines 619 presented across the interface 614 in alignment with the hours depicted in the timeline 618.

The display area 612 also includes a columnar menu 620 on the left side, a Windows-style tool bar 622 across the top, and a horizontal status bar 624 across the bottom, thus partially framing the calendar interface 614.

Immediately below the first tool bar 622 is a UI tool bar 626 presented horizontally above the timeline 618. Included in this UI tool bar 626 are three filters 628, 630, 632 and a cancel jobs button 634.

The first filter 628 is a Zoom function presented as a window that allows an operator to control how much detail is shown on the timeline 618. Choices can include: Hour, Day, and Week views.

The second filter 630 is Date Range function, also presented as a window, which allows the user to specify how much time before and after the current time the data should be displayed. Choices include: Today Only, Plus or Minus One Day, Plus or Minus One Week, Plus or Minus One Month. The user would use a report look at activity in the past that is outside of the one month range. Reports can be generated for display and printed on paper as well for activities within the date ranges set forth above.

The third filter 632 is a Job Status function, again presented as a window, that allows the user to only show jobs or assignments matching the status criteria. The choices here include: All, Active, Running, Pending The Cancel Jobs button 634 activates a function that enables a user to select assignments for cancellation that have not yet been completed.

Each assignment interface 616 is presented on the calendar interface 614 in a manner that shows the start time for each associated operation. Ideally, there is a vertical bar 637 of a distinguishing color, such as lime green, that indicates the current time as a reference. The vertical bar 637 is perpendicular to the timeline 618 as shown in FIG. 6. In the depicted embodiment, each assignment interface 616 is represented as a rectangular box with the left vertical line of the box positioned in alignment with the vertical position of the start time shown on the timeline 618. The interior 636 of the assignment interface 616 includes an assignment identifier 638 associated with an operation, as shown in the enlarged view of FIG. 7.

The entire content of the calendar interface 614 can be scrolled in any direction, however when scrolling vertically, the header timeline 618 showing the dates and hours will always remain visible.

The assignment interfaces 616 are preferably color coded to indicate their status. The start time is indicated by a vertical black bar 640 on the left ending in the diamond 642. If the assignment is an override, then the duration of the override is indicated by the horizontal line 644 extending to the terminator with the second diamond 646. In this sample shown in FIG. 7, there is a 3 hour configuration override that resulted in an error.

Hovering a mouse cursor over an assignment interface 616 will bring up a tooltip 648 as shown in FIG. 6. The tooltip provides additional details about the operation associated with the assignment interface 616. More detail can be provided in the tooltip than shown in this screen shot of FIG. 7, such as a summary of the EGMs affected by the operation associated with this assignment interface 616.

Figure 7:
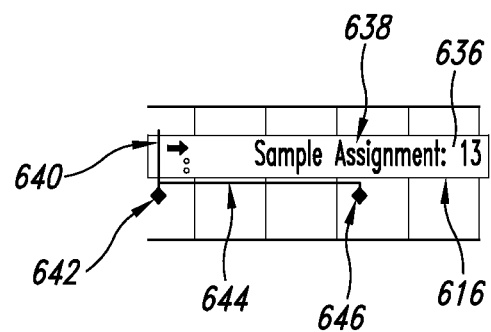
FIG. 7 illustrates an assignment block from the user interface of FIG. 6.

Two unique concepts are displayed in the screen shot of FIG. 7. The first is the linking of related operations, such as recurring scheduled assignments and the second is assignment interfaces that run multiple operations based on templates.

The first row of horizontally presented assignment interfaces 616 shown in FIG. 6 represent a recurring schedule of operations. Each horizontal curved linking line 652 is a visual relational indicator or icon that links a previous assignment interface 654 with the next occurring assignment interface 656. Here, the linking line 652 extends from an end or finish of the first assignment interface 654 to the beginning or start of the following assignment interface 656.

A Multi-Job Assignment interface template 652 shown at about 3:30 am on Monday represents an assignment that was set up to run two operations in sequence. In this case it is showing two downloads, but it might be a download followed by a configuration, or any combination of two or more operations. A vertically oriented curved linking line 653 connects the related assignment templates 652, 655.

Assignment interfaces 616 can be configured so that they schedule one or more operation templates describing what to do. In this way the actual instructions about what to configure or download can be shared at different times or for different EGMs without doing a clumsy copy step.

Double-Clicking or Opening an assignment interface 616 will open a detail window much like an expandable grid, but focused only on the operation in question. An operator or user will be able to see the individual status for each EGM and, in the case of configurations, for each option. Two or more of these can be opened at once to aid in comparing results.

Assignment interfaces 616 are located or positioned on the calendar interface 614 in a manner that keeps the presentation compact while at the same time avoiding overlaps. Ideally, all recurring operations scheduled during the time period of interest will be displayed near the top of the calendar interface 614 as shown so that they are horizontally aligned. Each operation will then be taken in start time order and displayed beginning at the top left corner of the calendar interface 614. Each subsequent assignment interface 616 is positioned one row below the ones already displayed until the start time has shifted forward far enough that the next subsequent assignment interface 616 can be presented in a new column without overwriting the previous ones. At this point, the current row is reset to the top and the next column of assignment interfaces 616 begins again.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to [insert list], are incorporated herein by reference, in their entirety. Aspects of the embodiments can be modified, if necessary to employ concepts of the various patents, applications and publications to provide yet further embodiments.

For example, each assignment interface rectangle 616 can include one or more progress indicators that will show in real time how much of the operation has been completed. Because an operation could involve more than one EGM, the percentage shown could be the average percent complete for all EGMs, or the percent complete for the one that is least complete (in order to give operator some idea of how much longer it will take to complete the operation), or some other useful measure of completion. The UI 610 will also provide some obvious indicator that an operation has had some kind of error and the operator or user will be able to select the indicator, such as clicking with a mouse device on that indicator, to see details of the error.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A non-transitory computer-readable medium whose contents enable a computing device to display on a display device a user interface for operations to be performed by remote end user electronic gaming devices, comprising:
   generating a display of the user interface that includes:
   operation assignment interfaces, each operation assignment interface providing information about an operation associated with the remote end user electronic gaming devices and configured to enable a user to selectively display and hide information about the operation and status of a plurality of selected remote end user electronic gaming devices coupled to the network, the selectively displayed information associated with each of the plurality of selected remote end user electronic gaming devices and including data indicative of:
   a hardware component inventory associated with the plurality of selected remote end user electronic gaming devices;
   a software package inventory associated with the plurality of selected remote end user electronic gaming devices; and
   a proposed modified software package for multicast distribution to each of the plurality of selected remote end user electronic gaming devices, the proposed modified software package including an end user electronic gaming device executable instruction set and a software package inventory generated responsive to the respective hardware component inventory and the respective software package inventory associated with the plurality of selected remote end user electronic gaming devices;
   a calendar interface that provides at least date and time information, and
   at least one graphical linking indicator that provides visual relational information of related operations using a linear graphical element that visually connects related adjacent operation assignment interfaces, the user interface configured to enable scheduling, updating, and monitoring of remote end user computing device operations through the operation assignment interfaces on the calendar interface.

2. The non-transitory computer-readable medium of claim 1 wherein the operation assignment interface provides information about at least one of an assignment identifier, status of the related operation, an error indicator, and a start time.

3. The non-transitory computer-readable medium of claim 1 wherein the operation assignment interface comprises a user-activated tooltip that provides additional information about operations associated with the operation assignment interface that is not otherwise displayed.

4. The non-transitory computer-readable medium of claim 1 wherein the calendar interface comprises a timeline displaying at least one of a date and time, and a graphical indicator interposed on the timeline to indicate at least one of current date and time.

5. The non-transitory computer-readable medium of claim 4 wherein the calendar interface, operation assignment interface, and graphical linking indicator can be scrolled while the timeline remains visible during scrolling.

6. The non-transitory computer-readable medium of claim 1 comprising a tool bar displaying at least one filter of one from among display detail, range of displayed date or time, and operation status of an assignment.

7. The non-transitory computer-readable medium of claim 6 wherein the tool bar further comprises a cancel selection icon that enables a user to cancel selected assignments.

8. The non-transitory computer-readable medium of claim 1 wherein operation assignment interfaces for recurring operations are displayed in horizontal alignment at a top region of the calendar interface and operation assignment interfaces for non-recurring operations are displayed below the operation assignment interfaces for recurring operations in a column format.

9. The non-transitory computer-readable medium of claim 1 wherein each operation assignment interface is displayed in a start time order beginning at a top left corner of the calendar interface, with each subsequent assignment interface positioned one row below a preceding operation assignment interface already displayed until a start time of a subsequent operation assignment interface has shifted forward far enough that a next subsequent operation assignment interface can be presented in a new column without overriding a previous operation assignment interface, at which point a current row is reset to a top of the display and a next column of operation assignment interfaces begins again.

10. The non-transitory computer-readable medium of claim 1 wherein generating a display of the user interface that includes an operation assignment interface that provides information about an operation associated with the plurality of selected end user electronic gaming devices further comprises:
    generating a display of the user interface that includes an operation assignment interface that provides information about an operation associated with the plurality of selected end user electronic gaming devices including a proposed modified software package for multicast distribution to each of the plurality of selected end user electronic gaming devices, the proposed modified software package generated responsive at least in part to at least one jurisdictional requirement associated with the plurality of selected end user electronic gaming devices.

11. A system, comprising:
    a network of end user electronic gaming devices;
    a display device; and
    a processor coupled to the network of end user electronic gaming devices and the display device and configured to generate a user interface on the display device that enables user management of network operations, the user interface including:
    operation assignment interfaces, each operation assignment interface providing information about at least one operation of the end user electronic gaming devices in the network of end user electronic gaming devices and configured to enable a user to selectively display and hide information about operation and status of a plurality of selected end user electronic gaming devices coupled to the network of end user devices, the selectively displayed information associated with each of the plurality of selected end user electronic gaming devices and including data indicative of at least:
    a hardware component inventory associated with the plurality of selected end user electronic gaming devices;

a software package inventory associated with the plurality of selected end user electronic gaming devices; and, a proposed modified software package for multicast distribution to each of the plurality of selected end user electronic gaming devices, the proposed modified software package including an end user electronic gaming device executable instruction set and a software package inventory generated responsive to the respective hardware component inventory and the respective software package inventory associated with the plurality of selected end user electronic gaming devices;

a calendar interface on which the operation assignment interfaces are displayed, the calendar interface providing at least date and time information, the user interface structured to enable automatic performance of operations by the network of end user electronic gaming devices and user monitoring and control of operations on individual end user electronic gaming devices in the network of end user electronic gaming devices via the user interface on the display device; and a graphic indicator of current date and time on the calendar interface.

12. The system of claim 11 wherein the operation assignment interface provides information about at least one of an assignment identifier, operation status, an error indicator, and a start time.

13. The system of claim 11 wherein the operation assignment interface comprises a user-activated tooltip.

14. The system of claim 11 wherein the calendar interface comprises a timeline displaying at least one of a date and time, and the graphical indicator interposed on the timeline to indicate at least one of current date and time comprises a vertical line of a distinguishing color to a color of the timeline that aligns with the current date and time on the timeline.

15. The system of claim 14 wherein the calendar interface, operation assignment interface, and graphical linking indicator can be scrolled while the timeline remains visible during scrolling.

16. The system of claim 11 comprising a tool bar displaying at least one filter of one from among display detail, range of displayed date or time, and operation status of an assignment.

17. The system of claim 16 wherein the tool bar further comprises a cancel selection that enables a user to cancel selected assignments.

18. The system of claim 11 wherein operation assignment interfaces for recurring operations are displayed in horizontal alignment at a top region of the calendar interface and operation assignment interfaces for non-recurring operations are displayed below the operation assignment interfaces for recurring operations in a column format.

19. The system of claim 11 wherein the processor comprises a computer-readable medium and the computer-readable medium has instructions stored thereon that when executed cause the processor to generate the user interface.

20. A method of providing a user interface for management of network operations on a network of electronic gaming devices, the method comprising:
presenting on an electronic display device that is coupled to the network of electronic gaming devices a time line along a time line axis with information that is indicative of at least one of dates or time;
for each of a number of operations, presenting on the electronic display device a respective assignment icon with a start point of the assignment icon represented by an additional graphical element in addition to and separate from the assignment icon, the additional graphical element positioned along the time line axis at a point that is indicative of a time that an operation represented by the assignment icon is scheduled to start;
the assignment icon associated with a plurality of end user electronic gaming devices and logically associated with one or more modified software packages for multicast distribution to a plurality of selected end user electronic gaming devices, the modified software package including one or more end user electronic gaming device executable instruction sets and a software package inventory autonomously selected responsive to a hardware component inventory associated with the plurality of selected end user electronic gaming devices and the software package inventory associated with the plurality of selected end user electronic gaming devices; and
enabling implementation of each of the number of operations by at least one device in the network of devices and monitoring of the implemented operation and associated device in the network of devices via the user interface on the display device.

21. The method of claim 20, further comprising:
for at least two of the operations that reoccur over time, presenting a linking icon between at least two assignment icons that visually represent a relational connection between the at least two operations associated with the at least two assignment icons that reoccur over time.

22. The method of claim 21 wherein presenting a linking icon between the assignment icons that represent the at least two operations that reoccur over time includes presenting a line that extends from at least proximate a finish of a first one of the assignment icons to at least proximate a start of an adjacent second one of the assignment icons.

23. The method of claim 20, further comprising:
for at least two of the operations that are logically connected, presenting a multi-operation linking icon between the assignment icons that represent the at least two operations that are logically connected.

24. The method of claim 23 wherein presenting a multi-operation linking icon between the assignment icons that represent the at least two operations that are logically connected includes presenting a line that extends from at least a proximate a start of a first one of the assignment icons to at least proximate a start of an adjacent second one of the assignment icons.

25. The method of claim 20 wherein presenting a respective assignment icon includes presenting the respective assignment icon along with a linear start marker extending vertically with respect to the time line axis and with a termination marker extending vertically with respect to the time line axis.

26. The method of claim 25, further comprising:
presenting the termination marker at a point along the time line axis indicative of an extended time; and
presenting an extension icon proximate one of the assignment icons where a termination time of the assignment represented by the assignment icon has been extended.

27. The method of claim 26 wherein presenting an extension icon includes presenting a line extending between the start marker and the termination marker.

28. The method of claim 20, further comprising, in response to a positioning of a cursor over a selected assignment icon, presenting detailed information about at least one aspect associated with the selected assignment icon.

29. The method of claim 28 wherein presenting detailed information about at least one aspect associated with the selected assignment icon includes presenting a list of devices affected by the operation represented by the selected assignment icon.

30. The method of claim 20, further comprising:
scrolling across a display of the assignment icons in a direction perpendicular to the time line axis in response to a user input while maintaining the display of the time line axis.

31. The method of claim 20, further comprising:
presenting a current time icon positioned along the time line axis at a point that is indicative of at least one of a current date and a current time.

32. The method of claim 31 wherein presenting a current time icon includes presenting a line extending perpendicular to the time line axis.

33. The method of claim 20, further comprising:
controlling a resolution of the time line that is presented based on a user selected input indicative of a level of presentation detail.

34. The method of claim 20, further comprising:
controlling a length of the time line that is presented in response to a user selected input indicative of a range of time line length.

35. The method of claim 20, further comprising:
in response to user input to present for display operations that correspond to an operation status, selecting a subset of operations having the selected operation status and presenting a respective assignment icon in which the subset of selected operations associated with the operation status is logically associated with the respective assignment icon.

36. The method of claim 35 wherein presenting a respective assignment icon includes presenting a human-readable title that is logically associated with the operation.

37. The method of claim 20, further comprising:
color coding the assignment icons based on a respective assignment type logically associated with the operation represented by the assignment icon.

38. The method of claim 37, further comprising:
determining the assignment type logically associated with the operation based at least in part on a title logically associated with the assignment icon.

39. The method of claim 37, further comprising:
stopping the presenting of a selected one of the assignment icons in response to a user input indicative of deletion of the operation represented by the selected assignment icon associated with the operation.

40. The method of claim 20 wherein presenting on the electronic display device a respective assignment icon further comprises:
presenting on the electronic display device an assignment icon associated with the plurality of selected end user electronic gaming machines and further associated with one or more end user electronic gaming device executable instruction sets and a software package inventory autonomously selected for multicast distribution to the plurality of selected end user electronic gaming devices responsive to at least one jurisdictional requirement associated with the plurality of selected end user electronic gaming devices.

* * * * *